(12) United States Patent
Yang et al.

(10) Patent No.: US 12,538,252 B2
(45) Date of Patent: Jan. 27, 2026

(54) POSITIONING REQUEST PROCESSING METHOD, AND DEVICE AND SYSTEM

(71) Applicant: HUAWEI TECHNOLOGIES CO., LTD., Guangdong (CN)

(72) Inventors: Mingyue Yang, Shanghai (CN); Runze Zhou, Shanghai (CN); Fangyuan Zhu, Beijing (CN); Jingwang Ma, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 702 days.

(21) Appl. No.: 17/955,358

(22) Filed: Sep. 28, 2022

(65) Prior Publication Data

US 2023/0017132 A1    Jan. 19, 2023

Related U.S. Application Data

(63) Continuation of application No. PCT/CN2020/082598, filed on Mar. 31, 2020.

(51) Int. Cl.
*H04W 64/00* (2009.01)

(52) U.S. Cl.
CPC .................. *H04W 64/00* (2013.01)

(58) Field of Classification Search
CPC ........ H04W 4/029; H04W 64/00; H04W 4/02
See application file for complete search history.

(56) References Cited

U.S. PATENT DOCUMENTS

| 10,506,543 B1 | 12/2019 | Edge et al. |
| 2020/0021946 A1* | 1/2020 | Kumar ................. G01S 1/0428 |
| 2022/0394655 A1* | 12/2022 | Shreevastav ............ H04W 4/12 |

FOREIGN PATENT DOCUMENTS

| CN | 109996346 A | 7/2019 |
| CN | 110166929 A | 8/2019 |
| CN | 110351828 A | 10/2019 |
| CN | 110475200 A | 11/2019 |
| CN | 110881216 A | 3/2020 |

(Continued)

OTHER PUBLICATIONS

3GPP TS 23.273 V16.3.0, "3rd Generation Partnership Project; Technical Specification Group Services and System Aspects; 5G System (5GS) Location Services (LCS); Stage 2(Release 16)," Marhc 2020, 94 pages.

(Continued)

*Primary Examiner* — Allahyar Kasraian
(74) *Attorney, Agent, or Firm* — Fish & Richardson P.C.

(57) ABSTRACT

The present disclosure relates to positioning request processing methods, devices, and systems In one example method, a mobility management network element receives a request message, and sends a first message to a location management network element based on the request message, where the first message is used to trigger the location management network element to obtain location information of a first terminal device through user plane positioning. After receiving the first message, the location management network element sends a second message to the first terminal device based on the first message by using a protocol data unit (PDU) session of the first terminal device, where the second message indicates the first terminal device to report positioning data.

20 Claims, 9 Drawing Sheets

(56) References Cited

FOREIGN PATENT DOCUMENTS

WO  2019174437 A1  9/2019

OTHER PUBLICATIONS

3GPP TR 23.731, V16.0.0, "3rd Generation Partnership Project; Technical Specification Group Services and System Aspects; Study on Enhancement to the 5GC Location Services (Release 16)," Dec. 2018, 170 pages.
Open Mobile Alliance, "User Plane Location Protocol Candidate Version 3.0," Nov. 13, 2015, 294 pages.
Extended European Search Report in European Appln No. 20929585.6, dated Mar. 22, 2023, 12 pages.
3GPP TS 23.501 V16.4.0, "3rd Generation Partnership Project; Technical Specification Group Services and System Aspects; System Architecture for the 5G System (5GS); Stage 2 (Release 16)," Mar. 2020, 430 pages.
International Search Report and Written Opinion in International Appln. No. PCT/CN2020/082598, mailed on Dec. 29, 2020, 17 pages (with English translation).

* cited by examiner

POSITIONING REQUEST PROCESSING METHOD, AND DEVICE AND SYSTEM

CROSS-REFERENCE TO RELATED APPLICATIONS

This application is a continuation of International Application No. PCT/CN2020/082598, filed on Mar. 31, 2020, the disclosure of which is hereby incorporated by reference in its entirety.

TECHNICAL FIELD

This application relates to the communications field, and in particular, to a positioning request processing method, a device, and a system.

BACKGROUND

Currently, a core network may externally provide a positioning service for a specific terminal device by using a capability exposure interface or a positioning service interface.

After a positioning request of a positioning demander arrives at an access and mobility management function (access and mobility management function, AMF) network element through the capability exposure interface or the positioning service interface, the AMF network element selects a proper location management function (location management function, LMF) network element to calculate a location of the terminal device. Subsequently, the LMF network element interacts with the terminal device, to obtain data used to calculate the location of the terminal device.

In the foregoing process of interaction between the LMF network element and the terminal device, all data packets are transmitted through a control plane channel. For example, an uplink transmission path is "the terminal device—a radio access network device—the AMF network element—the LMF network element", and a downlink transmission path is "the LMF network element—the AMF network element—the radio access network device—the terminal device".

However, the AMF network element may process a large quantity of services, and therefore may not forward a data packet of a positioning service in time. Consequently, response duration of the positioning service is excessively long.

SUMMARY

Embodiments of this application provide a positioning request processing method, a device, and a system, to reduce a response delay of a positioning service.

To achieve the foregoing objective, the following technical solutions are used in embodiments of this application.

According to a first aspect, a positioning request processing method is provided. The method includes: A location management network element receives a first message from a mobility management network element, where the first message is used to trigger the location management network element to obtain location information of a first terminal device through user plane positioning, and then the location management network element sends a second message to the first terminal device based on the first message by using a PDU session of the first terminal device, where the second message indicates the first terminal device to report positioning data.

Based on this solution, in a positioning service, an LMF network element may interact with a positioned terminal device by using a user plane transmission path of the positioned terminal device, to avoid interaction performed through forwarding of an AMF network element, namely, a control plane transmission path. Therefore, excessively long response duration of the positioning service caused because the AMF network element cannot forward a data packet of the positioning service in time can be avoided, to reduce response duration of the positioning service or reduce a probability of positioning service interruption.

In a possible design, the first message includes first indication information, and the first indication information indicates the location management network element to obtain the location information of the first terminal device through user plane positioning. Based on this possible design, a solution in which the first message explicitly triggers, by using the first indication information, the location management network element to obtain the location information of the first terminal device by using a user plane can be implemented.

In a possible design, the first message includes second indication information, and the second indication information indicates that the mobility management network element is in a congested state, to trigger the location management network element to obtain the location information of the first terminal device through user plane positioning. Based on this possible design, the location management network element may be indirectly triggered to obtain the location information of the first terminal device by using the user plane.

In a possible design, the positioning request processing method further includes: The location management network element obtains an IP address of the first terminal device. That the location management network element sends a second message to the first terminal device based on the first message by using a PDU session of the first terminal device includes: The location management network element sends the second message to the first terminal device based on the first message by using a user plane network element corresponding to the PDU session of the first terminal device, where a destination address of the second message is the IP address of the first terminal device.

In a possible design, that the location management network element obtains an IP address of the first terminal device includes: The location management network element receives the IP address that is of the first terminal device and that is from a session management network element, where the session management network element serves the first terminal device.

In a possible design, the positioning request processing method further includes: The location management network element obtains address information of the session management network element, and sends a third message to the session management network element based on the address information of the session management network element, where the third message is used to request the IP address of the first terminal device.

In a possible design, that the location management network element obtains address information of the session management network element includes: The location management network element sends a fourth message to a unified data management network element, where the fourth message is used to request the address information of the session management network element, and then the location management network element receives the address information that is of the session management network element and that is from the unified data management network element.

In a possible design, the positioning request processing method further includes: The location management network element sends third indication information to the mobility management network element, where the third indication information is used to trigger the mobility management network element to notify the first terminal to establish the PDU session of the first terminal device. Based on this possible design, because the location management network element may indicate the first terminal device to establish the PDU session of the first terminal device, it can be ensured that there is an available PDU session to transmit positioning service data.

In a possible design, the positioning request processing method further includes: The location management network element receives the positioning data from the first terminal device by using the PDU session of the first terminal device, and determines the location information of the first terminal device based on the positioning data. Based on this possible design, in uplink transmission of the positioning service, the positioning data of the positioning service may alternatively be transmitted by using the user plane transmission path of the positioned terminal device, to similarly avoid transmission performed through forwarding of the AMF network element, namely, the control plane transmission path. Therefore, the excessively long response duration of the positioning service caused because the AMF network element cannot forward the data packet of the positioning service in time can be avoided, to further reduce the response duration of the positioning service or reduce the probability of positioning service interruption.

According to a second aspect, a positioning request processing method is provided. The method includes: A mobility management network element receives a request message, where the request message is used to request location information of a first terminal device, and the mobility management network element sends a first message to a location management network element based on the request message, where the first message is used to trigger the location management network element to obtain the location information of the first terminal device through user plane positioning.

Based on this solution, because the first message may trigger the location management network element to obtain the location information of the first terminal device through user plane positioning, in a subsequent positioning process, an LMF network element may interact with a positioned terminal device by using a user plane transmission path of the positioned terminal device, to avoid interaction performed through forwarding of an AMF network element, namely, a control plane transmission path. Therefore, excessively long response duration of a positioning service caused because the AMF network element cannot forward a data packet of the positioning service in time can be avoided, to reduce response duration of the positioning service or reduce a probability of positioning service interruption.

In a possible design, the first message includes first indication information, and the first indication information indicates the location management network element to obtain the location information of the first terminal device through user plane positioning. Based on this possible design, a solution in which the first message explicitly triggers, by using the first indication information, the location management network element to obtain the location information of the first terminal device by using a user plane can be implemented.

In a possible design, the first message includes second indication information, and the second indication information indicates that the mobility management network element is in a congested state, to trigger the location management network element to obtain the location information of the first terminal device through user plane positioning.

In a possible design, that the mobility management network element sends a first message to a location management network element based on the request message may include: When the mobility management network element is in the congested state, the mobility management network element sends the first message to the location management network element based on the request message. Based on this possible design, the location management network element may be indirectly triggered to obtain the location information of the first terminal device by using the user plane.

In a possible design, the positioning request processing method further includes: The mobility management network element sends fourth indication information to a session management network element, where the fourth indication information indicates the session management network element to send an IP address of the first terminal device to the location management network element, and the session management network element serves the first terminal device. Based on the possible design, the location management network element can learn of the IP address of the first terminal device, so that a message can be sent to the first terminal device by using a PDU session of the first terminal device, to reduce a response delay of the positioning service.

In a possible design, the positioning request processing method further includes: The mobility management network element receives third indication information from the location management network element, where the third indication information is used to trigger the mobility management network element to notify the first terminal device to establish the PDU session of the first terminal device. The mobility management network element sends fifth indication information to the first terminal device based on the third indication information, where the fifth indication information indicates the first terminal device to establish the PDU session of the first terminal device. Based on this possible design, because the mobility management network element may indicate, as triggered by the third indication information, the first terminal device to establish the PDU session of the first terminal device, it can be ensured that there is an available PDU session to transmit positioning service data.

According to a third aspect, a positioning request processing method is provided. The method includes: A first terminal device receives a second message from a location management network element by using a PDU session of the first terminal device, obtains positioning data based on the second message, and then sends the positioning data to the location management network element by using the PDU session of the first terminal device.

Based on this solution, because an LMF network element may interact with a positioned terminal device by using a user plane transmission path of the positioned terminal device, interaction performed through forwarding of an AMF network element, namely, a control plane transmission path, can be avoided. Therefore, excessively long response duration of a positioning service caused because the AMF network element cannot forward a data packet of the positioning service in time can be avoided, to reduce response duration of the positioning service or reduce a probability of positioning service interruption.

In a possible design, that a first terminal device receives a second message from a location management network element by using a PDU session of the first terminal device includes: The first terminal device receives the second message from the location management network element by using a user plane network element corresponding to the PDU session of the first terminal device, where a destination address of the second message is an internet protocol IP address of the first terminal device.

In a possible design, that the first terminal device sends the positioning data to the location management network element by using the PDU session of the first terminal device includes: The first terminal device sends the positioning data to the location management network element by using the user plane network element corresponding to the PDU session of the first terminal device.

in a possible design, the positioning request processing method may further include: The first terminal device receives fifth indication information from a mobility management network element, where the fifth indication information indicates the first terminal device to establish the PDU session of the first terminal device, and the first terminal device establishes the PDU session of the first terminal device based on the fifth indication information. Based on this possible design, because the first terminal device may establish the PDU session of the first terminal device as indicated by the mobility management network element, it can be ensured that there is an available PDU session to transmit positioning service data.

According to a fourth aspect, a location management network element is provided. The location management network element has a function of implementing the method in the first aspect. The function may be implemented by hardware, or may be implemented by hardware executing corresponding software. The hardware or the software includes one or more modules corresponding to the foregoing function.

According to a fifth aspect, a location management network element is provided, and includes a processor and a memory. The memory is configured to store computer-executable instructions; and when the location management network element runs, the processor executes the computer-executable instructions stored in the memory, so that the location management network element performs the positioning request processing method according to any one of the possible designs of the first aspect.

According to a sixth aspect, a location management network element is provided, and includes a processor. The processor is configured to: after being coupled to a memory and reading instructions in the memory, perform, according to the instructions, the positioning request processing method according to any one of the possible designs of the first aspect.

According to a seventh aspect, a location management network element is provided, and includes a processor and an interface circuit. The interface circuit may be a code/data read/write interface circuit, and the interface circuit is configured to receive computer-executable instructions (where the computer-executable instructions are stored in a memory, and may be read front the memory directly or through another component) and transmit the computer-executable instructions to the processor. The processor is configured to run the computer-executable instructions to perform the positioning request processing method according to any one of the possible designs of the first aspect.

According to an eighth aspect, a computer-readable storage medium s provided. The computer-readable storage medium stores instructions; and when the instructions are run on a computer, the computer is enabled to perform the positioning request processing method according to any one of the possible designs of the first aspect.

According to a ninth aspect, a computer program product including instructions is provided. When the computer program product runs on a computer, the computer is enabled to perform the positioning request processing method according to any one of the possible designs of the first aspect.

According to a tenth aspect, an apparatus (for example, the apparatus may be a chip system provided. The apparatus includes a processor, configured to support a location management network element in implementing the function in the first aspect. In a possible design, the apparatus further includes a memory. The memory is configured to store program instructions and data that are necessary for a location management network element. When the apparatus is the chip system, the apparatus may include a chip, or may include the chip and another discrete component.

For a technical effect brought by any design manner of the fourth aspect to the tenth aspect, refer to a technical effect brought by different design manners of the first aspect. Details are not described herein again.

According to an eleventh aspect, a mobility management network element is provided, and the mobility management network element has a function of implementing the method in the second aspect. The function may be implemented by hardware, or may be implemented by hardware executing corresponding software. The hardware or the software includes one or more modules corresponding to the function.

According to a twelfth aspect, a mobility management network element is provided, and includes a processor and a memory. The memory is configured to store computer-executable instructions. When the mobility management network element runs, the processor executes the computer-executable instructions stored in the memory, so that the mobility management network element performs the positioning request processing method according to any one of the possible designs of the second aspect.

According to a thirteenth aspect, a mobility management network element is provided, and includes a processor. The processor is configured to: after being coupled to a memory and reading instructions in the memory, perform, according to the instructions, the positioning request processing method according to any one of the possible designs of the second aspect.

According to a fourteenth aspect, a mobility management network element is provided, and includes a processor and an interface circuit. The interface circuit may be a code/data read/write interface circuit, and the interface circuit is configured to receive computer-executable instructions (where the computer-executable instructions are stored in a memory, and may be read from the memory directly or through another component) and transmit the computer-executable instructions to the processor. The processor is configured to run the computer-executable instructions to perform the positioning request processing method according to any one of the possible designs of the second aspect.

According to a fifteenth aspect, a computer-readable storage medium is provided. The computer-readable storage medium stores instructions; and when the instructions are run on a computer, the computer is enabled to perform the positioning request processing method according to any one of the possible designs of the second aspect.

According to a sixteenth aspect, a computer program product including instructions is provided. When the computer program product runs on a computer, the computer is enabled to perform the positioning request processing method according to any one of the possible designs of the second aspect.

According to a seventeenth aspect, an apparatus (for example, the apparatus may be a chip system) is provided. The apparatus includes a processor, configured to support a mobility management network element in implementing the function in the second aspect. In a possible design, the apparatus further includes a memory. The memory is configured to store program instructions and data that are necessary for the mobility management network element. When the apparatus is the chip system, the apparatus may include a chip, or may include the chip and another discrete component.

For a technical effect brought by any design manner of the eleventh aspect to the seventeenth aspect, refer to a technical effect brought by different design manners of the second aspect. Details are not described herein.

According to an eighteenth aspect, a first terminal device is provided. The first terminal device has a function of implementing the method in the third aspect. The function may be implemented by hardware, or may be implemented by hardware executing corresponding software. The hardware or the software includes one or more modules corresponding to the function.

According to a nineteenth aspect, a first terminal device is provided, and includes a processor and a memory. The memory is configured to store computer-executable instructions. When the first terminal device runs, the processor executes the computer-executable instructions stored in the memory, so that the first terminal device is enabled to perform the positioning request processing method according to any one of the possible designs of the third aspect.

According to a twentieth aspect, a first terminal device is provided, and includes a processor. The processor is configured to: after being coupled to a memory and reading instructions in the memory, perform, according to the instructions, the positioning request processing method according to any one of the possible designs of the third aspect.

According to a twenty-first aspect, a first terminal device is provided, and includes a processor and an interface circuit. The interface circuit may be a code/data read/write interface circuit, and the interface circuit is configured to receive computer-executable instructions (where the computer-executable instructions are stored in a memory, and may be read from the memory directly or through another component) and transmit the computer-executable instructions to the processor. The processor is configured to run the computer-executable instructions to perform the positioning request processing method according to any one of the possible designs of the third aspect.

According to a twenty-second aspect, a computer-readable storage medium is provided, The computer-readable storage medium stores instructions; and when the instructions are run on a computer, the computer is enabled to perform the positioning request processing method according to any one of the possible designs of the third aspect.

According to a twenty-third aspect, a computer program product including instructions is provided. When the computer program product runs on a computer, the computer is enabled to perform the positioning request processing method according to any one of the possible designs of the third aspect.

According to a twenty-fourth aspect, an apparatus (for example, the apparatus may be a chip system) is provided. The apparatus includes a processor, configured to support a first terminal device in implementing the function in the third aspect. In a possible design, the apparatus further includes a memory. The memory is configured to store program instructions and data that are necessary for the first terminal device. When the apparatus is the chip system, the apparatus may include a chip, or may include the chip and another discrete component.

For a technical effect brought by any design manner of the eighteenth aspect to the twenty-fourth aspect, refer to a technical effect brought by different design manners of the third aspect. Details are not described herein again.

According to a twenty-fifth aspect, a communication system is provided. The communication system includes a location management network element and a mobility management network element, The location management network element is configured to perform the steps performed by the location management network element in the first aspect or the solutions provided in embodiments of this application. The mobility management network element is configured to perform the steps performed by the mobility management network element in the second aspect or the solutions provided in embodiments of this application.

In a possible design, the communication system may further include a first terminal device. The first terminal device is configured to perform the steps performed by the first terminal device in the third aspect or the solutions provided in embodiments of this application.

In a possible design, the communication system may further include another device that interacts with the location management network element, the mobility management network element, or the first terminal device in the solutions provided in embodiments of this application, for example, a first device or a session management network element. This is not specifically limited in embodiments of this application.

These or other aspects of this application are more concise and easier to understand in descriptions of the following embodiments.

DESCRIPTION OF EMBODIMENTS

The following describes the technical solutions in embodiments of this application with reference to the accompanying drawings in embodiments of this application. In the descriptions of this application, unless otherwise specified, "/" indicates an "or" relationship between associated objects. For example, A/B may indicate A or B. In this application, "and/or" describes only an association relationship between associated objects and indicates that three relationships may exist. For example, A and/or B may indicate the following three cases: Only A exists, both A and B exist, and only B exists, where A or B may be singular or plural. In addition, in the descriptions of this application, "a plurality of" means two or more than two. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that provide basically same functions and purposes. A person skilled in the art may understand that the terms such as "first" and "second" do not limit a quantity or an execution sequence, and the terms such as "first" and "second" do not indicate a definite difference.

In addition, a positioning request processing method provided in embodiments of this application is applicable to a plurality of system architectures. A network architecture and a service scenario described in embodiments of this application are intended to describe the technical solutions in embodiments of this application more clearly, and do not constitute a limitation on the technical solutions provided in embodiments of this application. A person of ordinary skill in the art may learn that: With evolution of the network architecture and emergence of a new service scenario, the technical solutions provided in embodiments of this application are also applicable to similar technical problems.

Figure 1A:
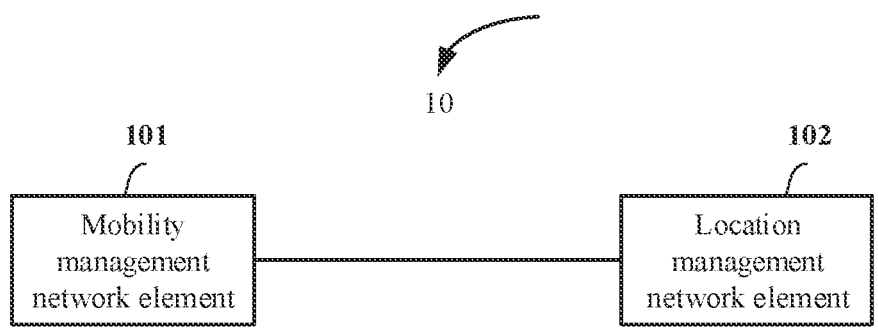
FIG. 1a is a schematic diagram of a structure of a communication system according to an embodiment of this application.

FIG. 1a shows a communication system 10 according to an embodiment of this application. The communication system 10 includes a mobility management network element 101 and a location management network element 102.

The mobility management network element 101 and the location management network element 102 may directly communicate with each other or may communicate with each other through forwarding by another device. This is not specifically limited in this embodiment of this application. In this embodiment of this application:

The mobility management network element 101 is configured to receive a request message, where the request message is used to request location information of a first terminal device.

The mobility management network element 101 is further configured to send a first message to the location management network element based on the request message, where the first message is used to trigger the location management network element 102 to obtain the location information of the first terminal device through user plane positioning.

The location management network element 102 is configured to receive the first message from the mobility management network element 101, where the first message is used to trigger the location management network element 102 to obtain the location information of the first terminal device through user plane positioning.

The location management network element 102 is further configured to send a second message to the first terminal device based on the first message by using a protocol data unit PDU session of the first terminal device, where the second message indicates the first terminal device to report positioning data.

In the communication system provided in this embodiment of this application, after receiving the request message used to request the location information of the first terminal device, the mobility management network element may send, to the location management network element, the first message used to trigger the location management network element to obtain the location information of the first terminal device through user plane positioning. Therefore, after receiving the first message, the location management network element sends, to the first terminal device based on the first message by using the PDU session of the first terminal device, the second message used to indicate the first terminal device to report the positioning data. Based on the communication system provided in this embodiment of this application, because the location management network element notifies the first terminal device to report the positioning data by using a user plane, communication with the first terminal device by using the mobility management network element can be avoided, and a problem that the mobility management network element cannot forward a data packet of a positioning service in time can be avoided. In this way, a response delay of the positioning service is reduced or a probability of positioning service interruption is reduced.

Optionally, in addition to the foregoing functions, the mobility management network element 101 may be further configured to perform mobility management in a mobile network, for example, user location update, user registration with a network, and user handover. In a 5th generation (5th generation, 5G) communication system, a network element or an entity corresponding to the mobility management network element 101 may be an access and mobility management function (access and mobility management function, AMF) network element in a 5G network architecture. Namf is a service-based interface provided by the AMF network element, and the AMF network element may communicate with another network function through Namf. In a system of future communication such as 6th generation (the 6th generation, 6G) communication, the mobility management network element 101 may still be the AMF network element, or the mobility management network element 101 has another name. This is not limited in this embodiment of this application.

Optionally, in addition to the foregoing functions, the location management network element 102 may be further configured to manage a positioning request of the positioning service, allocate a positioning resource, obtain location information of a terminal device, return the location information to a related network element, and the like. In the 5G generation communication system, a network element or an entity corresponding to the location management network element 102 may be a location management function (location management function, LMF) network element in the 5G network architecture. Nlmf is a service-based interface provided by the AMF network element, and the LMF network element may communicate with another network function through Nlmf. In a system of future communication such as the 6th generation (the 6th generation, 6G) communication, the location management network element 102 may still be the LMF network element, or the location management network element 102 has another name. This is not limited in this embodiment of this application.

Figure 1B:
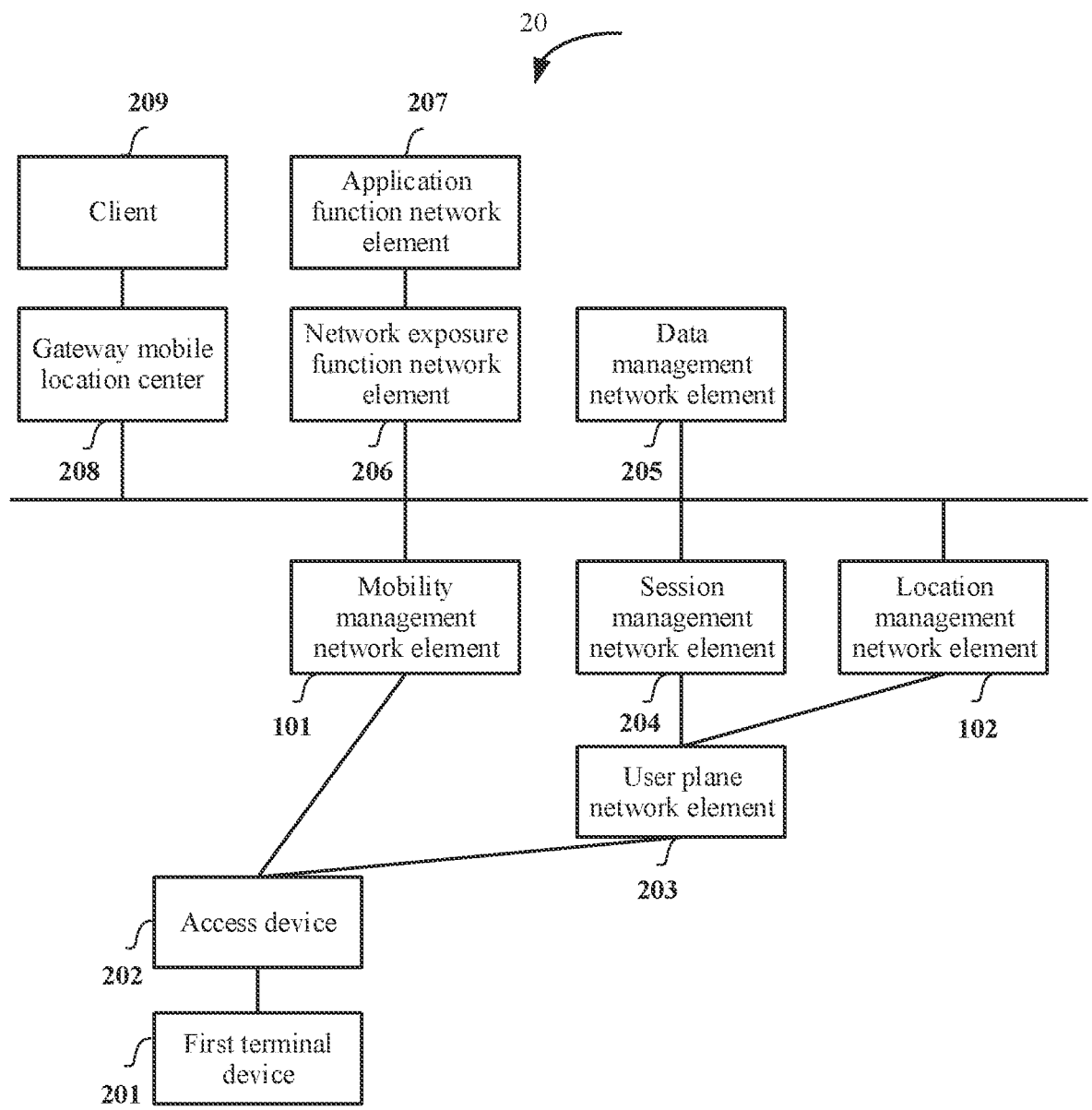
FIG. 1b is a schematic diagram of a structure of another communication system according to an embodiment of this application.

FIG. 1*b* shows another possible communication system 20 to which an embodiment of this application is applicable. In addition to the mobility management network element 101 and the location management network element 102 in FIG. 1*a*, the communication system 20 may further include: a first terminal device 201, an access device 202, a user plane network element 203, a session management network element 204, a data management network element 205, a network exposure function network element 206, an application function network element 207, a gateway mobile location center 208, and a client 209. In the preceding information:

The first terminal device 201 is a device that has a wireless transceiver function, and may be deployed on land, including indoor, outdoor, handheld, or in-vehicle deployment; may be deployed on water (for example, on a steamship), or may be deployed in the air (for example, on an airplane, a balloon, or a satellite). The first terminal device 201 may be a mobile phone (mobile phone), a tablet computer (pad), a computer having a wireless transceiver function, a virtual reality (virtual reality, VR) terminal, an augmented reality (augmented reality, AR) terminal, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), and the like.

The access device 202 is a device that provides a wireless communication function for the first terminal device. For example, the access device 202 includes, but is not limited to: a next generation NodeB (gNodeB, gNB) in 5G, an evolved NodeB (evolved NodeB, eNB), a radio network controller (radio network controller, RNC), a NodeB (NodeB, NB), a base station controller (base station controller, BSC), and a base transceiver station (base transceiver station, BTS), a home base station (for example, a home evolved NodeB, or a home NodeB, HNB), a baseband unit (baseband unit, BBU), a transmission point (transmitting and receiving point, TRP), a transmitting point (transmitting point, TP), and a mobile switching center.

The user plane network element 203 is configured to perform packet routing and forwarding, quality of service (quality of service, QoS) processing of user plane data, and the like. In a 5G communication system, a network element or an entity corresponding to the user plane network element 203 may be a user plane function (user plane function, UPF) network element in a 5G network architecture. In a system of future communication such as 6th generation (the 6th generation, 6G) communication, the user plane network element 203 may still be the UPF network element, or the user plane network element 203 has another name. This is not limited in this embodiment of this application.

The session management network element 204 is configured to manage a session in a mobile network, for example, establish, modify, or release the session. In the 5G communication system, a network element or an entity corresponding to the session management network element 204 may be a session management function (session management function, SMF) network element in the 5G network architecture. In a system of future communication such as the 6th generation (the 6th generation, 6G) communication, the session management network element 204 may still be the SMF network element, or the session management network element 204 may have another name. This is not limited in this embodiment of this application.

The data management network element 205 is configured to process a user identifier, access authentication, registration, mobility management, or the like, In the 5G communication system, a network element or an entity corresponding to the data management network element may be a unified data management (unified data management, UDM) network element in the 5G network architecture, where Nudm is a service-based interface provided by the UDM network element, and the UDM network element may communicate with another network function through Nudm. In a system of future communication such as the 6G communication, the data management network element 205 may still be the UDM network element, or the data management network element 205 has another name. This is not limited in this embodiment of this application.

The network exposure function network element 206 mainly provides a service, so that a 3rd generation partnership project (3rd generation partnership project, 3GPP) network can securely provide a network service capability for a third-party service provider: the application function network element 207. In the 5G communication system, the network exposure function network element 206 may be a network exposure function (NEF) network element. Nnef is a service-based interface provided by the NEF network element, and the NEF network element may communicate with another network function through Nnef. In a system of future communication such as the 6G communication, the network exposure function network element 206 may still be the NEF network element or has another name. This is not limited in this embodiment of this application.

The application function network element 207 is mainly configured to provide application layer information for the 3GPP network. In the 5G communication system, the application function network element 207 may be an application function (application function, AF) network element. Naf is a service-based interface provided by the AF network element, and the AF network element may communicate with another network function through Naf. In a system of future communication such as the 6G communication, the application function network element 207 may still be the AF network element or ha another name. This is not limited in this embodiment of this application. For example, the AF network element may include a service capability server (service capability server, SCS) or an application server (application server, AS).

The gateway mobile location center 208 is mainly configured to process a positioning request of a positioning service, and select a proper mobility management network element for the positioning service. In the 5G communication system, the gateway mobile location center may be a gateway mobile location centre (GMLC). In a system of future communication such as the 6G communication, the gateway mobile location center 208 may still be the GMLC, or the gateway mobile location center 208 has another name. This is not limited in this embodiment of this application.

The client 209 may be a demander of location information of the first terminal device, and may also be referred to as a client.

Figure 2:
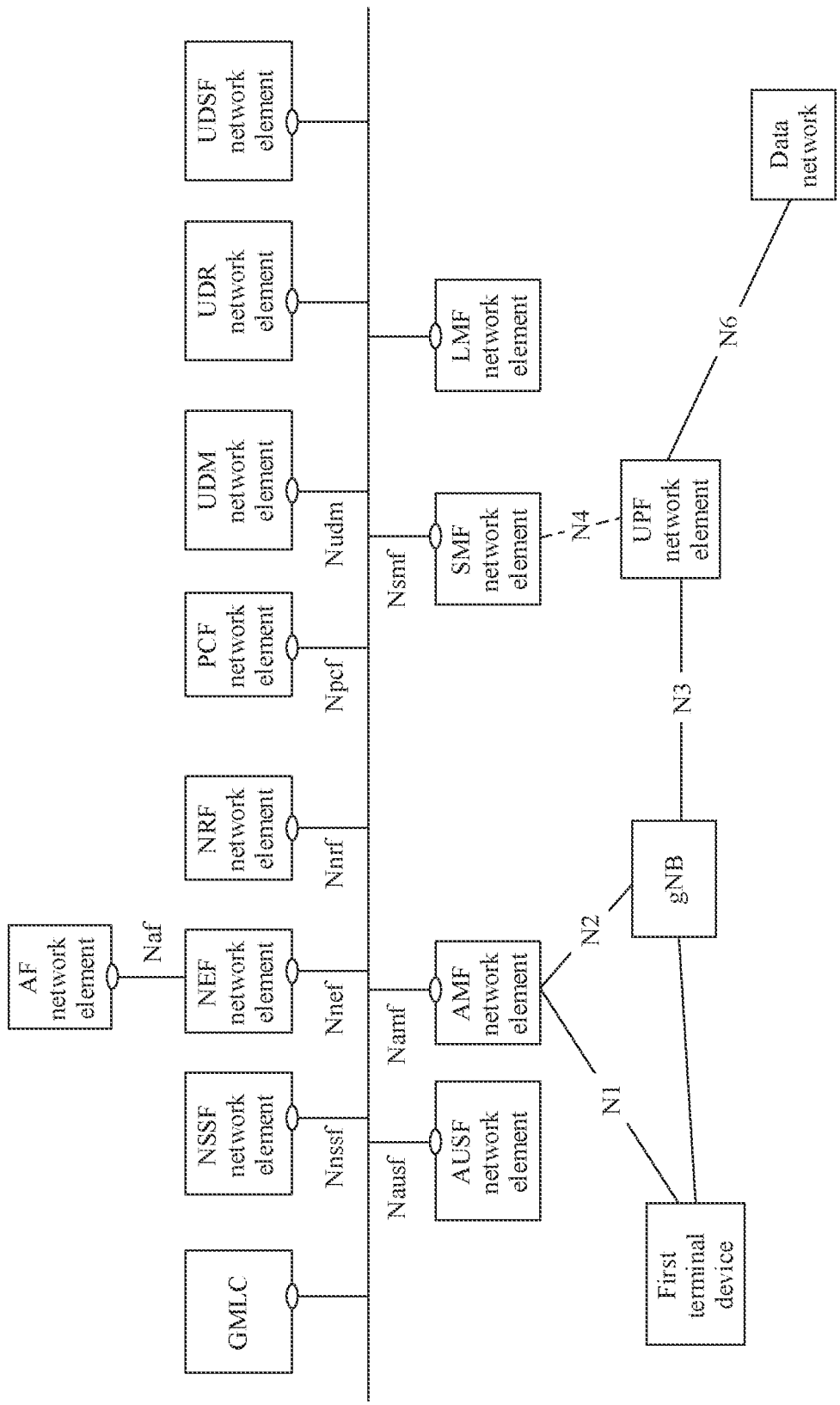
FIG. 2 is a schematic diagram of application of a communication system in a 5G network according to an embodiment of this application.

In addition, FIG. 2 is a schematic diagram of a specific possible network architecture to which an embodiment of this application is applicable, where a 5G communication system is used as an example. The AMF network element, the LMF network element, the first terminal device, the gNB, the UPF network element, the SMF network element, the UDM network element, the NEF network element, the AF network element, the GMLC, and the client are included. In addition, the 5G communication system may further include an authentication server function (authentication server function. AUSF) network element, a network slice selection function (network slice selection function, NSSF) network element, a network function repository function (network exposure function Repository Function, NRF) network element, a policy control function (policy control function, PCF) network element, and a unified data repository (unified data repository, UDR) network element, an unstructured data storage function (unstructured data storage function, UDSF), or the like. This is not specifically limited in this embodiment of this application.

An N1 interface in FIG. 2 is a reference point between the first terminal device and the AMF network element. An N2 interface is a reference point between the gNB and the AMF network element, and is configured to send a non-access stratum (non-access stratum, NAS) message, a next generation application protocol (next generation application protocol, NGAP) message, and the like. An N3 interface is a reference point between the gNB and the UPF network element, and is configured to transmit user plane data and the like. An N4 interface is a reference point between the SMF and the UPF, and is configured to transmit information such as tunnel identification information, data cache indication information, and a downlink data notification message of an N3 connection. An N6 interface is a reference point between the UPF network element and a data network (data network, DN), and is configured to transmit the user plane data, and the like.

In addition, a control plane network element such as the AUSF network element, the AMF network element, the SMF network element, the LMF network element, the NSSF network element, the NEF network element, the NRF network element, the PCF network element, the UDM network element, the UDR network element, the UDSF network element, or the AF network element shown in FIG. 2 may also perform interaction through a service-oriented interface. For example, a service-oriented interface provided by the AUSF network element for external connection may be Nausf, a service-oriented interface provided by the AMF network element for external connection may be Namf, a service-oriented interface provided by the SMF network element for external connection may be Nsmf, a service-oriented interface provided by the NSSG network element for external connection may be Nnssf, a service-oriented interface provided by the NEF network element for external connection may be Nnef, a service-oriented interface provided by the NRF network element for external connection may be Nnrf, a service-oriented interface provided by the PCF network element for external connection may be Npcf, a service-oriented interface provided by the UDM network element for external connection may be Nudm, and a service-oriented interface provided by the AF network element for external connection may be Naf. For related descriptions, refer to a diagram of a 5G system architecture (5G system architecture) in the 23501 standard. Details are not described herein.

It may be understood that the foregoing network elements or functions may be network elements in a hardware device, may be software functions running on dedicated hardware, or may be virtualized functions instantiated on a platform (for example, a cloud platform). One or more services may be obtained through division into the network elements or the functions. Further, services that exist independently of network functions may occur. In this application, instances of the functions, instances of services included in the functions, or instances of services that exist independently of network functions may be referred to as service instances.

Figure 3:
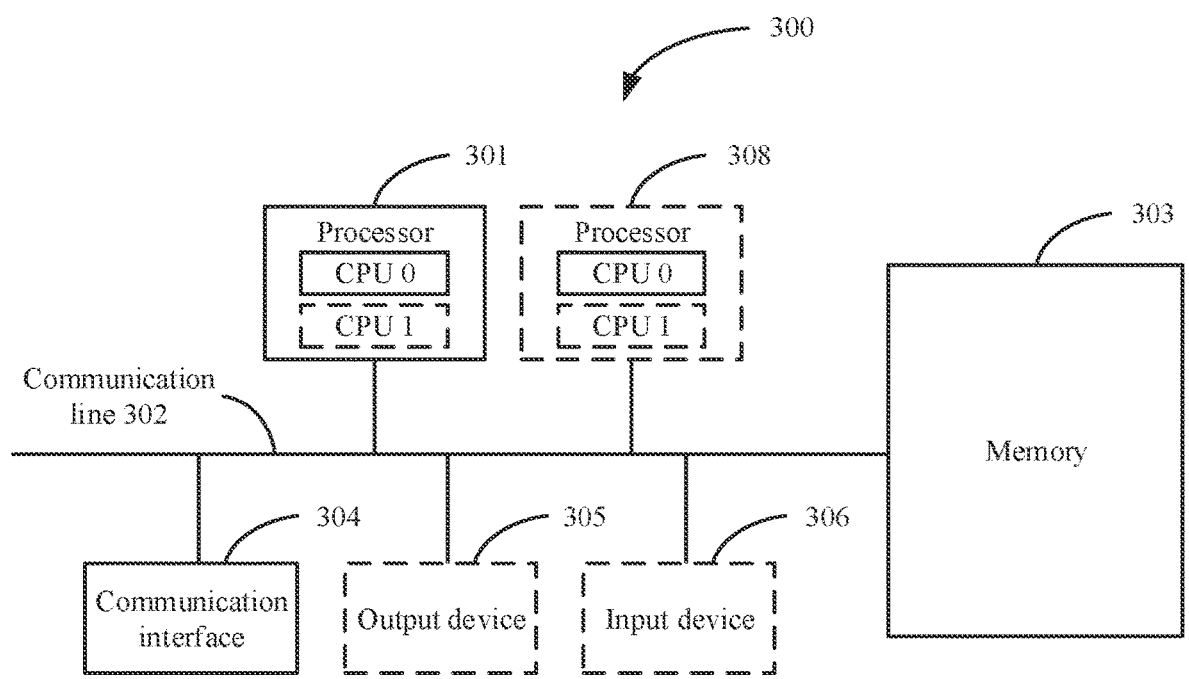
FIG. 3 is a schematic diagram of a hardware structure of a communication device according to an embodiment of this application.

For example, the foregoing network elements or functions may be implemented by using a communication device in FIG. 3. FIG. 3 is a schematic diagram of a hardware structure of the communication device according to an embodiment of this application. The communication device 300 includes a processor 301, a communication line 302, a memory 303, and at least one communication interface (where in FIG. 3, that a communication interface 304 is included is merely used as an example for description).

The processor 301 may be a general-purpose central processing unit (central processing unit, CPU), a microprocessor, an application-specific integrated circuit (application-specific integrated circuit, ASIC), or one or more integrated circuits configured to control program execution of the solutions of this application.

The communication line 302 may include a path for transmitting information between the foregoing components.

The communication interface 304 is usable in any apparatus such as a transceiver, and is configured to communicate with another device or a communication network such as the Ethernet, a radio access network (radio access network, RAN), or a wireless local area network (wireless local area network, WLAN).

The memory 303 may be a read-only memory (read-only memory, ROM) or another type of static storage device capable of storing static information and instructions, a random access memory (random access memory, RAM) or another type of dynamic storage device capable of storing information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compressed optical disc, a laser disc, an optical disc, a digital versatile disc, a Blu-ray optical disc, and the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor through the communication line 302. Alternatively, the memory may be integrated with the processor.

The memory 303 is configured to store computer-executable instructions for performing the solutions in this application, and the processor 301 controls execution. The processor 301 is configured to execute the computer-executable instructions stored in the memory 303, to implement the positioning request processing method provided in the following embodiments of this application.

Optionally, the computer-executable instructions in this embodiment of this application may also be referred to as application program code. This is not specifically limited in this embodiment of this application.

During specific implementation, in an embodiment, the processor 301 may include one or more CPUs such as a CPU 0 and a CPU 1 in FIG. 3.

During specific implementation, in an embodiment, the communication device 300 may include a plurality of processors, for example, the processor 301 and a processor 308 in FIG. 3. Each of the processors may be a single-core (single-CPU) processor, or may be a multi-core (multi-CPU) processor. The processor herein may be one or more devices, circuits, and/or processing cores configured to process data (for example, computer program instructions).

During specific implementation, in an embodiment, the communication device 300 may further include an output device 305 and an input device 306. The output device 305 communicates with the processor 301, and may display information in a plurality of manners. For example, the output device 305 may be a liquid crystal display (liquid crystal display, LCD), a light emitting diode (light emitting diode, LED) display device, a cathode ray tube (cathode ray tube, CRT) display device, a projector (projector), or the like. The input device 306 communicates with the processor 301, and may receive an input of a user in a plurality of manners. For example, the input device 306 may be a mouse, a keyboard, a touchscreen device, or a sensing device.

The foregoing communication device 300 may be a general-purpose device or a dedicated device. During specific implementation, the communication device 300 may be a desktop computer, a portable computer, a network server, a palmtop computer (personal digital assistant, PDA), a mobile phone, a tablet computer, a wireless terminal device, an embedded device, or a device with a structure similar to that in FIG. 3. A type of the communication device 300 is not limited in this embodiment of this application.

The following describes in detail the positioning request processing method provided in embodiments of this application with reference to FIG. 1a to FIG. 3.

It should be noted that embodiments of this application are not limited to the 5G network architecture shown in FIG. 2, and may be further applied to another future communication system, for example, a 6G network architecture. In addition, in a future communication system, a function of each network element used in embodiments of this application may remain unchanged, but a name of each network element may change.

Figure 4:
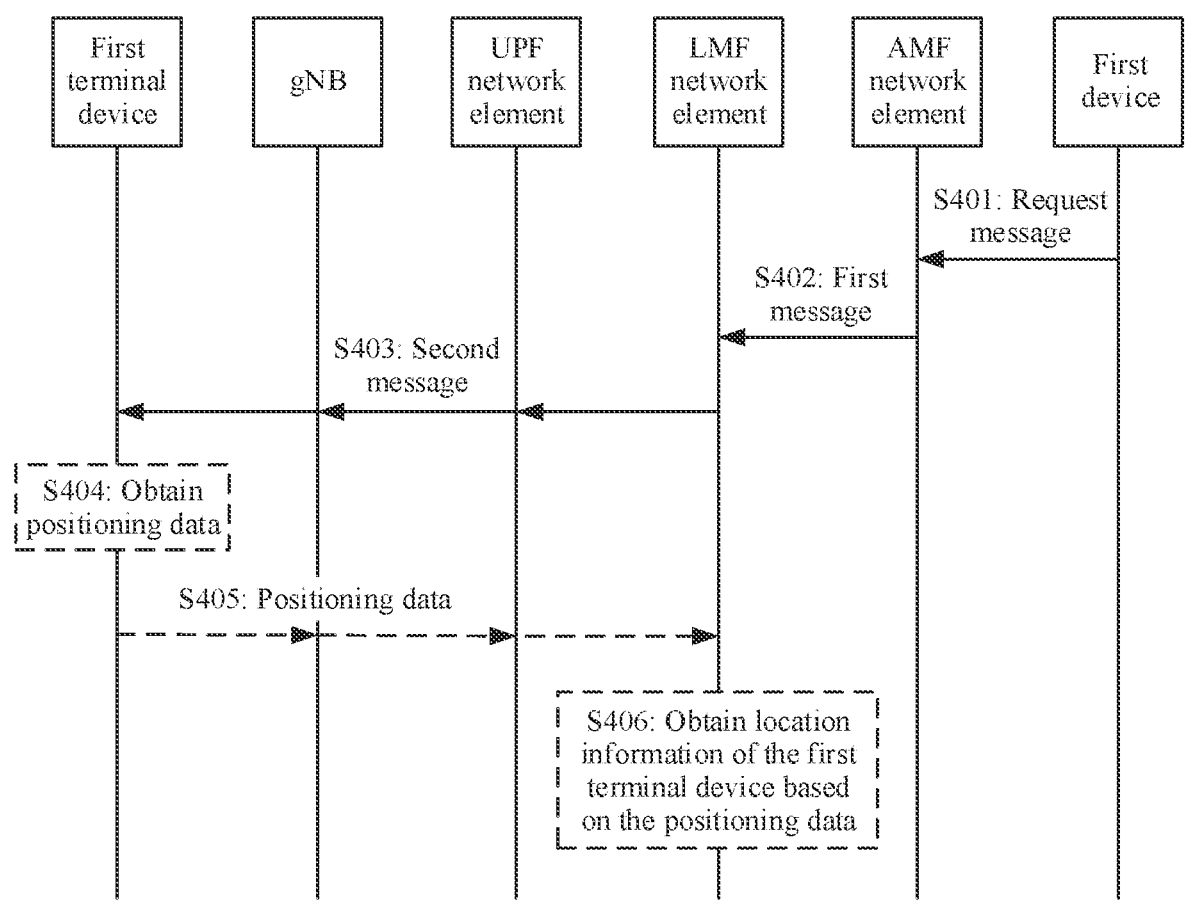
FIG. 4 is a schematic flowchart of a positioning request processing method according to an embodiment of this application.

For example, the communication system shown in FIG. 1a or FIG. 1b is used in the 5G network shown in FIG. 2. FIG. 4 shows a positioning request processing method according to an embodiment of this application. The positioning request processing method includes the following steps.

S401: A first device sends a request message to an AMF network element. Correspondingly, the AIF network element receives the request message from the first device.

The request message is used to request location information of a first terminal device, in other words, the first terminal device may be understood as a positioning object.

Optionally, the first device may be between a demander (briefly referred to as a demander below) of the location information of the first terminal device and the AMF network element, and is configured to select an AMF network element to process a positioning request. In this case, it may be considered that the demander communicates with the AMF network element through forwarding by the first device. For example, the first device may be a GMLC or an NEF network element, and the demander may be, for example, a third-party application server or an AF network element. In this case, before step S401, the first device further receives a message that is of the demander and that is used to request the location information of the first terminal device. Alternatively, the first device may be the demander of the location information of the first terminal device. This is not specifically limited in this embodiment of this application.

The request message may include an identifier of e first terminal device. Optionally, the identifier of the first terminal device may be a subscription permanent identifier (subscription permanent identifier, SUPI) of the first terminal device, or may be a generic public subscription identifier (generic public subscription identifier, GPSI).

Optionally, the request message may further include positioning accuracy information, and location information of the demander of the location information of the first terminal device, Optionally, the positioning accuracy information indicates an accuracy requirement of the demander for the location information of the first terminal device. For example, when the positioning accuracy information is 1 meter, it indicates that the demander requires that a Euclidean distance between a location indicated by returned location information of the first terminal device and an actual location of the first terminal device be less than or equal to 1 meter; and when the positioning accuracy information is 10 meters, it indicates that the demander requires that a Euclidean distance between a location indicated by returned location information of the first terminal device and an actual location of the first terminal device be less than or equal to 10 meters.

Optionally, the location information of the demander indicates a location of the demander, and may be geographical location coordinates of the demander in a location system (for example, a global positioning system (global positioning system, GPS) or a BeiDou satellite system), or may be a location of the demander in a mobile communication network, for example, a cell identifier (cell identifier) or a tracking area identity (tracking area identifier, TAI).

S402: The AMF network element sends a first message to an LMF network element based on the request message. Correspondingly, the LMF network element receives the first message from the AMF network element.

The first message is used to trigger the LMF network element to obtain the location information of the first terminal device through user plane positioning.

The first message may include the identifier of the first terminal device. Optionally, the first message may further include the positioning accuracy information, and the location information of the demander of the location information of the first terminal device. Refer to related descriptions in step S401. Details are not described herein again.

Optionally, after receiving the request message, the AMF network element may determine, based on a status of the AMF network element, whether the AMF network element can perform related transmission of a positioning service in time (for example, forward a data packet of the positioning service). When determining that the AMF network element cannot perform related transmission of the positioning service in time, the AMF network element sends the first message to the LMF network element, to trigger the LMF network element to obtain the location information of the first terminal device through user plane positioning.

For example, that the AMF network element determines that the AMF network element cannot perform related transmission of the positioning service in time may be as follows: The AMF network element detects whether load of the AMF network element is greater than a first threshold. When the load of the AMF network element is greater than the first threshold, the AMF network element determines that the AMF network element is in a congested state, to determine that the AMF network element cannot perform related transmission of the positioning service in time.

Alternatively, optionally, after receiving the request message, the AMF network element may not determine the status of the AMF network element, but send the first message to the LMF network element, to trigger the LI IF network element to obtain the location information of the first terminal device through user plane positioning, to reduce load of the AMF network element. This is not specifically limited in this embodiment of this application.

Optionally, the first message may trigger, in a plurality of manners, the LMF network element to obtain the location information of the first terminal device through user plane positioning. For example:

In a possible implementation, a message name or a message type of the first message may be used as a trigger condition, and the message name or this type of message may trigger the LMF network element to obtain the location information of the first terminal device through user plane positioning. In other words, a message having a specific name or a specific type of message may trigger the LMF network element to perform user plane positioning.

In another possible implementation, the first message may include first indication information, and the first indication information indicates the LME network element to obtain the location information of the first terminal device through user plane positioning. In other words, the first message explicitly triggers, by using the first indication information, the LMF network element to obtain the location information of the first terminal device through user plane positioning.

Optionally, in this implementation, the first indication information may be represented by one bit in the first message. When a value of the bit is " 1" or "0", it indicates that the first indication information indicates the LMF network element to obtain the location information of the first terminal device through user plane positioning, In still another possible implementation, when the AMF network element determines that the AMF network element is in the congested state, the first message may include second indication information, and the second indication information may indicate that the AMF network element is in the congested state, to trigger the LMF network element to obtain the location information of the first terminal device through user plane positioning. In other words, the first message indicates, by using the second indication information, that the AMF network element is in the congested state, to indirectly trigger the LMF network element to obtain the location information of the first terminal device through user plane positioning.

For example, the second indication information may be represented by one bit in the first message. When a value of the bit is " 1" or "0", it indicates that the AMF network element is in the congested state, to trigger the LMF network element to obtain the location information of the first terminal device through user plane positioning.

S403: The LMF network element sends a second message to the first terminal device based on the first message. Correspondingly, the first terminal device receives the second message from the LMF network element.

The second message indicates the first terminal device to report positioning data, and the positioning data is used by the LMF network element to obtain the location information of the first terminal device. The positioning data may also be referred to as measurement data (measurement data), and the positioning data and the measurement data may be replaced with each other. This is not specifically limited in this embodiment of this application.

Optionally, after receiving the first message from the AMF network element, the LMF network element may select a proper location calculation method, then determine the positioning data that is provided by the first terminal device and that is required by the location calculation method, and send the second message to the first terminal device.

The LMF network element sends the second message to the first terminal device based on the first message by using a protocol data unit (protocol data unit, PDU) session of the first terminal device. Correspondingly, the first terminal device receives the second message from the LMF network element by using the PDU session of the first terminal device.

Optionally, that the LMF network element sends the second message to the first terminal device based on the first message by using the PDU session of the first terminal device may include: The LMF network element sends the second message to the first terminal device by using a user plane network element (where a UPF network element is used as an example) corresponding to the PDU session of the first terminal device, where a destination address of the second message is an IP address of the first terminal device. Correspondingly, that the first terminal device receives the second message from the LMF network element by using the PDU session of the first terminal device may include: The first terminal device receives the second message from the LMF network element by using the user plane network element corresponding to the PDU session of the first terminal device.

In other words, a transmission path of the second message may be "the LMF network element—the UPF network element—a gNB—the first terminal device". The transmission path "the UPF network element—the gNB—the first terminal device" is a transmission path established when the PDU session of the first terminal device is established, and may also be referred to as a user plane transmission path of the first terminal device.

"By using the PDU session of the first terminal device" may also be understood as "by using the user plane transmission path of the first terminal device", In this case, correspondingly, "by using the user plane network element corresponding to the PDU session of the first terminal device" may be understood as and mutually replaced with "by using the user plane network element of the user plane transmission path of the first terminal device". This is not specifically limited in this embodiment of this application.

Based on this solution, in the positioning service, the LMF network element may interact with a positioned terminal device by using the user plane transmission path of the positioned terminal device, to avoid interaction performed through forwarding of the AMF network element, namely, a control plane transmission path. Therefore, excessively long response duration of the positioning service caused because the AMF network element cannot forward the data packet of the positioning service in time can be avoided, to reduce response duration of the positioning service or reduce a probability of positioning service interruption.

Optionally, in an implementation scenario of this embodiment of this application, the positioning request processing method further includes the following steps S404 to S406.

S404: The first terminal device obtains the positioning data.

After receiving the second message, the first terminal device may obtain the positioning data based on the second message.

Optionally, that the first terminal device obtains the positioning data may be: The first terminal device performs collection and measurement (for example, measures signal quality of a neighboring cell of a current serving cell of the first terminal device) based on a requirement of the LMF network element, to obtain the positioning data.

S405: The first terminal device sends the positioning data to the LMF network element. Correspondingly, the LMF network element receives the positioning data from the first terminal device.

The first terminal device may alternatively send the positioning data to the LMF network element by using the PDU session of the first terminal device. Correspondingly, the LMF network element receives the positioning data from the first terminal device by using the PDU session of the first terminal device.

Optionally, that the first terminal device sends the positioning data to the LMF network element by using the PDU session of the first terminal device may include: The first terminal device sends the positioning data to the IMF network element by using the user plane network element (where the UPI; network element is used as an example) corresponding to the PDU session of the first terminal device. Correspondingly, that the LMF network element receives the positioning data from the first terminal device by using the PDU session of the first terminal device may include: The LMF network element receives the positioning data from the first terminal device by using the user plane network element corresponding to the PDU session of the first terminal device.

in other words, a transmission path of the positioning data may be "the first terminal device—the gNB—the UPF network element—the LMF network element". The transmission path "the first terminal device—the gNB—the UPF network element" is a transmission path established when the PDU session of the first terminal device is established, and may also be referred to as the user plane transmission path of the first terminal device.

S406: The LMF network element determines the location information of the first terminal device based on the positioning data.

Optionally, after receiving the positioning data, the LMF network element may determine the location information of the first terminal device based on the location calculation method selected in the foregoing step S403.

Optionally, after determining the location information of the first terminal device, the LMF network element may send the location information of the first terminal device to the AMF network element, so that the AMF network element returns the location information of the first terminal device to the first device.

Based on this solution, in uplink transmission of the positioning service, positioning data of the positioning service may alternatively be transmitted by using the user plane transmission path of the positioned terminal device, to similarly avoid transmission performed through forwarding of the AMF network element, namely, the control plane transmission path. Therefore, the excessively long response duration of the positioning service caused because the AMF network element cannot forward the data packet of the positioning service in time can be avoided, to further reduce the response duration of the positioning service or reduce the probability of positioning service interruption.

The actions of the network elements in the foregoing steps in FIG. 4 may be performed by the processor 301 in the communication device 300 shown in FIG. 3 by invoking application program code stored in the memory 303. This is not limited in this embodiment.

Figure 5:
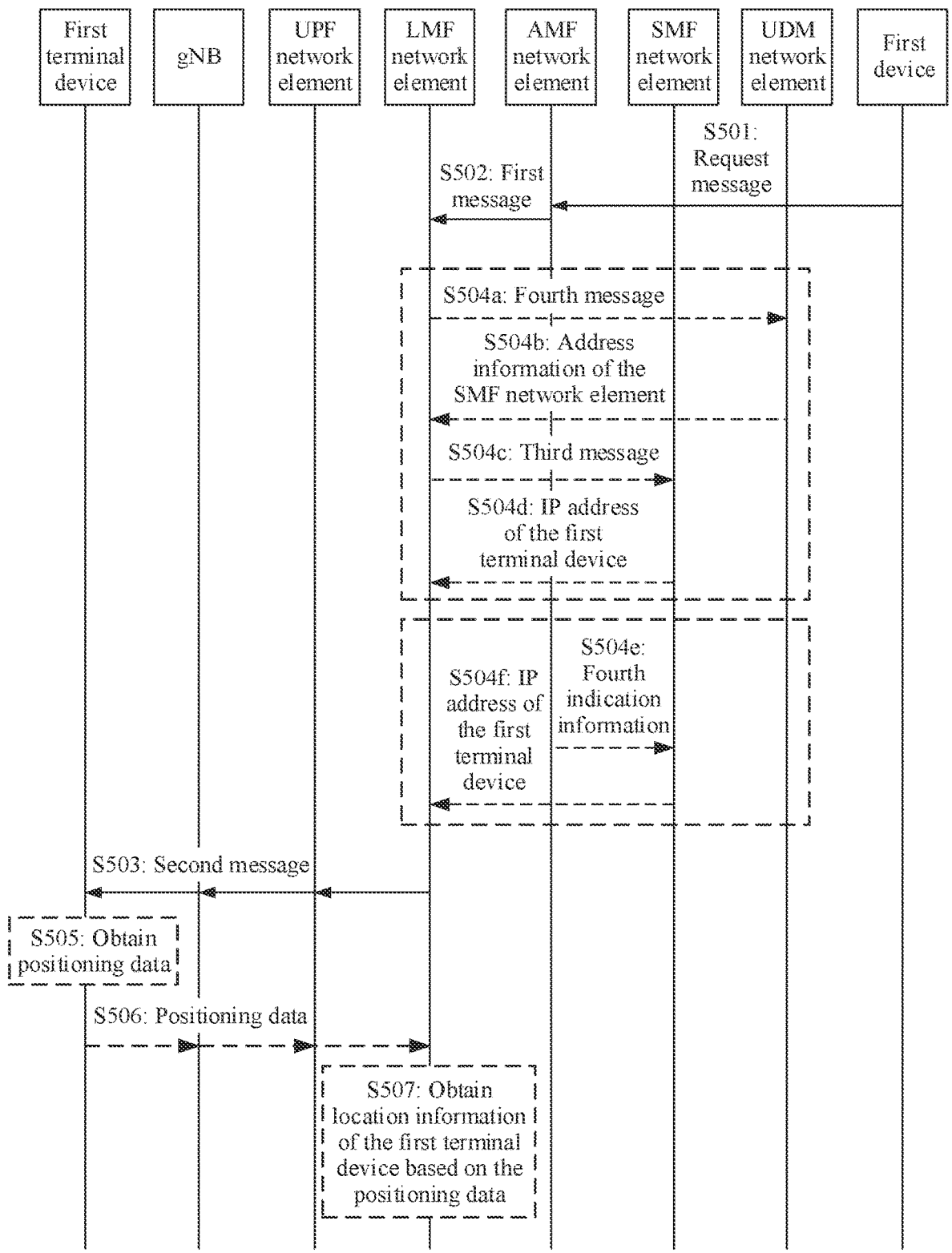
FIG. 5 is a schematic flowchart of another positioning request processing method according to an embodiment of this application.

Optionally, for example, the communication system shown in FIG. 1a or FIG. 1b is used in the 5G network shown in FIG. 2. FIG. 5 shows another positioning request processing method according to an embodiment of this application, The positioning request processing method includes the following steps.

S501: A first device sends a request message to an AMF network element. Correspondingly, the AMF network element receives the request message from the first device.

S502: The AMF network element sends a first message to an LMF network element based on the request message. Correspondingly, the LMF network element receives the first message from the AMF network element.

S503: The LMF network element sends a second message to a first terminal device based on the first message. Correspondingly, the first terminal device receives the second message from the LMF network element.

Steps S501 to S503 are the same as steps S401 to S403 in the embodiment shown in FIG. 4. For related descriptions, refer to the embodiment shown in FIG. 4. Details are not described herein again.

That the LMF network element sends the second message to the first terminal device based on the first message in step S503 includes: The LMF network element sends the second message to the first terminal device based on the first message by using a PDU session of the first terminal device.

Based on this solution, in a positioning service, the LMF network element may interact with a positioned terminal device by using a user plane transmission path of the positioned terminal device, to avoid interaction performed through forwarding of the AMF network element, namely, a control plane transmission path. Therefore, excessively long response duration of the positioning service caused because the AMF network element cannot forward a data packet of the positioning service in time can be avoided, to reduce response duration of the positioning service or reduce a probability of positioning service interruption.

It should be noted that the embodiment shown in FIG. 5 is described by using an example in which the PDU session of the first terminal device is successfully established before step S502.

Optionally, when the LMF network element sends the second message to the first terminal device by using the PDU session of the first terminal device, a destination address of the second message is an IP address of the first terminal device. Therefore, before step S503, the LMF network element further obtains the IP address of the first terminal device. The IP address is allocated to the first terminal device by an SMF network element serving the first terminal device in a PDU session establishment process of the first terminal device.

Optionally, that the LMF network element obtains the IP address of the first terminal device may include: The LMF network element receives the IP address that is of the first terminal device and that is from the SMF network element, where the SMF network element is a session management network element serving the first terminal device.

Optionally, the IP address of the first terminal device may be sent by the SMF network element to the LMF network element after the LMF network element requests the IP address from the SMF network element, or may be sent by the SMF network element to the LMF network element as indicated by the AMF network element. This is not specifically limited in this embodiment of this application.

Based on this, in a possible implementation, when the LMF network element requests the IP address of the first terminal device from the SMF network element, before step S503, the embodiment shown in FIG. 5 may further include the following steps:

S504a: The LMF network element sends a fourth message to a UDM network element. Correspondingly, the UDM network element receives the fourth message from the LMF network element.

The fourth message is used to request address information of the SMF network element.

It should be noted that in this embodiment of this application, in addition to the "fourth message", the "third message" is further related. The "third message" is described in detail in a subsequent embodiment. Details are not described herein again.

Optionally, the fourth message may include an identifier of the first terminal device, so that the UDM network element searches, based on the identifier of the first terminal device, for the SMF network element serving the first terminal device.

S504b: The UDM network element sends the address information of the SMF network element to the LMF network element. Correspondingly, the LMF network element receives the address information that is of the SW network element and that is from the UDM network element.

Optionally, when the PDU session of the first terminal device is established, the UDM network element may store related information about the established PDU session. Therefore, when the PDU session of the first terminal device is successfully established, the UDM network element may find the address information of the SMF network element and return the address information to the LMF network element.

It may be understood that the method performed by the LMF network element in steps S504a and S504b may be understood as a method for obtaining the address information of the SMF network element by the LMF network element.

S504c: The LMF network element sends a third message to the SMF network element. Correspondingly, the SMF network element receives the third message from the LMF network element.

The third message is used to request the IP address of the first terminal device.

Optionally, after obtaining the address information of the SMF network element, the LMF network element may send the third message to the SMF network element based on the address information of the SMF network element. After receiving the third message, the SMF network element may perform the following step S504d in response to the third message.

S504d: The SMF network element sends the IP address of the first terminal device to the LMF network element. Correspondingly, the LMF network element receives the IP address that is of the first terminal device and that is from the SMF network element.

Based on this solution, the LMF network element may obtain the IP address of the first terminal device by using the UDM network element and the SMF network element, to implement user plane interaction with the first terminal device based on the IP address in the positioning service, to reduce a response delay of the positioning service.

In another possible implementation, when the AMF network element indicates the SMF network element to send the IP address of the first terminal device to the LMF network element, before step S503, the method shown in FIG. 5 may further include the following steps:

S504e: The AMF network element sends fourth indication information to the SMF network element. Correspondingly, the SMF network element receives the fourth indication information from the AMF network element.

The fourth indication information indicates the SMF network element to send the IP address of the first terminal device to the LMF network element.

It should be noted that in this embodiment of this application, in addition to the "fourth indication information", the "third indication information" is further related. The "third indication information" is described in detail in a subsequent embodiment. Details are not described herein again.

S504f: The SMF network element sends the IP address of the first terminal device to the LMF network element. Correspondingly, the LMF network element receives the IP address that is of the first terminal device and that is from the SMF network element.

Optionally, after receiving the fourth indication information from the AMF network element, the SMF network element may send the IP address of the first terminal device to the LMF network element based on the fourth indication information, that is, perform step S504f.

Based on this solution, because the AMF network element may indicate the SMF network element to send the IP address of the first terminal device to the LMF network element, interaction between the LMF network element and the SMF network element and/or the UDM network element can be reduced, and a positioning service processing delay of the LMF network element can be further reduced.

In this case, the LMF network element may send, to the first terminal device based on the PDU session of the first terminal device, the second message whose destination address is the IP address of the first terminal device.

It may be understood that there is no strict execution sequence between step S504e and step S502. Step S504e may be performed before step S502, step S502 may be performed before step S504e, or step S504e and step S502 may be simultaneously performed. This is not specifically limited in this embodiment of this application.

Optionally, in an implementation scenario of this embodiment of this application, after step S503, the method shown in FIG. 5 further includes the following steps S505 to S507.

S505: The first terminal device obtains positioning data.

S506: The first terminal device sends the positioning data to the LMF network element. Correspondingly, the LMF network element receives the positioning data from the first terminal device.

S507: The LMF network element determines location information of the first terminal device based on the positioning data.

Steps S505 to S507 are respectively the same as steps S404 to S406 in the embodiment shown in FIG. 4. For related descriptions, refer to the embodiment shown in FIG. 4. Details are not described herein again.

Based on this possible design, in uplink transmission of the positioning service, positioning data of the positioning service may alternatively be transmitted by using the user plane transmission path of the positioned terminal device, to similarly avoid transmission performed through forwarding of the AMF network element, namely, the control plane transmission path. Therefore, the excessively long response duration of the positioning service caused because the AMF network element cannot forward the data packet of the positioning service in time can be avoided, to further reduce the response duration of the positioning service or reduce the probability of positioning service interruption.

The actions of the network elements in the foregoing steps in FIG. 5 may be performed by the processor 301 in the communication device 300 shown in FIG. 3 by invoking the application program code stored in the memory 303. This is not limited in this embodiment.

Figure 6:
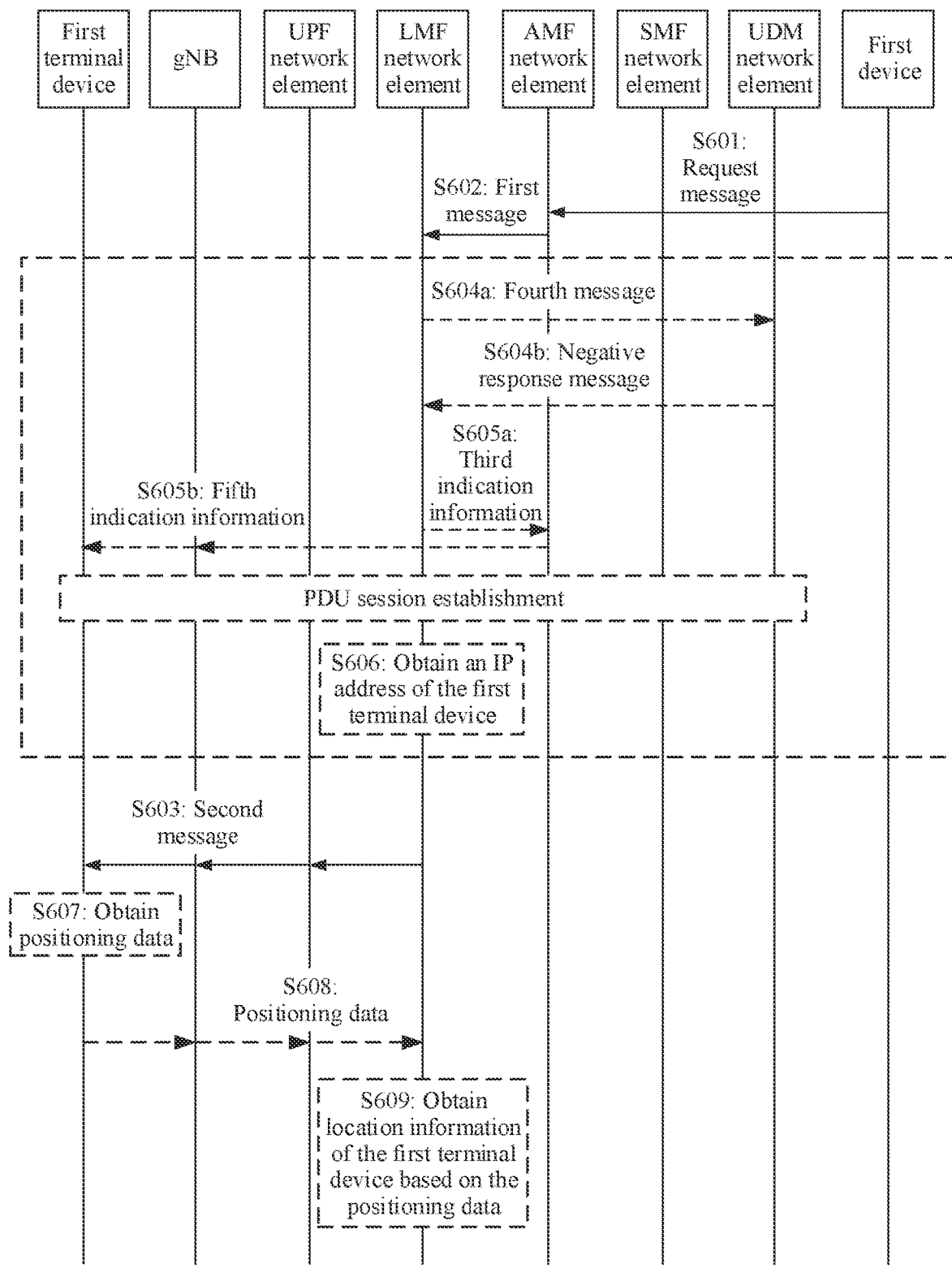
FIG. 6 is a schematic flowchart of still another positioning request processing method according to an embodiment of this application.

Optionally, for example, the communication system shown in FIG. 1a or FIG. 1b is used in the 5G network shown in FIG. 2. FIG. 6 shows still another positioning request processing method according to an embodiment of this application. The positioning request processing method includes the following steps.

S601: A first device sends a request message to an AMF network element. Correspondingly, the AMF network element receives the request message from the first device.

S602: The AMF network element sends a first message to an LMF network element based on the request message. Correspondingly, the LMF network element receives the first message from the AMF network element.

S603: The LMF network element sends a second message to a first terminal device based on the first message. Correspondingly, the first terminal device receives the second message from the LMF network element.

Steps S601 to S603 are the same as steps S401 to S403 in the embodiment shown in FIG. 4. For related descriptions, refer to the embodiment shown in FIG. 4. Details are not described herein again.

That the LMF network element sends the second message to the first terminal device based on the first message in step S603 includes: The LMF network element sends the second message to the first terminal device based on the first message by using a PDU session of the first terminal device.

Based on this solution, in a positioning service, the LMF network element may interact with a positioned terminal device by using a user plane transmission path of the positioned terminal device, to avoid interaction performed through forwarding of the AMF network element, namely, a control plane transmission path. Therefore, excessively long response duration of the positioning service caused because the AMF network element cannot forward a data packet of the positioning service in time can be avoided, to reduce response duration of the positioning service or reduce a probability of positioning service interruption.

Optionally, in this embodiment, before step S603, the LMF network element may determine whether the PDU session of the first terminal device is successfully established. In this case, the embodiment shown in FIG. 6 may further include the following steps S604a and S604b.

S604a: The LMF network element sends a fourth message to a UDM network element. Correspondingly, the UDM network element receives the fourth message from the LMF network element.

The fourth message is used to request address information of an SMF network element, and the SMF network element is a session management network element serving the first terminal device.

Optionally, the fourth message may include an identifier of the first terminal device, so that the UDM network element searches, based on the identifier of the first terminal device, for the SMF network element serving the first terminal device.

Optionally, if the UDM network element does not find the address information of the SMF network element, it indicates that the PDU session of the first terminal device is not established. In this case, the UDM network element may not respond to the fourth message. For example, the UDM network element does not send any message to the LMF network element. Alternatively, the UDM network element may notify the LMF network element that the address information of the SMF network element is not found. In this scenario, the following step S604b may be performed.

S604b: The UDM network element sends a negative response message to the LMF network element. Correspondingly, the LMF network element receives the negative response message from the UDM network element.

The negative response message is used to notify the LMF network element that the address information of the SMF network element is not found.

Correspondingly, when the LMF network element does not receive the address information that is of the SMF network element and that is from the UDM network element, it is determined that the PDU session of the first terminal device is not established. In this case, optionally, the embodiment shown in FIG. 6 may further include the following steps S605a and S605b.

S605a: The IMF network element sends third indication information to the AMF network element. Correspondingly, the AMF network element receives the third indication information from the LMF network element.

The third indication information is used to trigger the AMF network element to notify the first terminal device to establish the PDU session of the first terminal device.

S605b: The AMF network element sends fifth indication information to the first terminal device. Correspondingly, the first terminal device receives the fifth indication information from the AMF network element.

The fifth indication information notifies the first terminal device to establish the PDU session of the first terminal device.

Optionally, after receiving the third indication information from the LMF network element, the AMF network element may send the fifth indication information to the first terminal device based on the triggering by the third indication information, so that the first terminal device establishes the PDU session.

Correspondingly, as shown in FIG. 6, after receiving the fifth indication information, the first terminal device may trigger a PDU session establishment, and perform a PDU session establishment procedure with a core network, to establish the PDU session of the first terminal device.

It may be understood that after the PDU session of the first terminal device is successfully established, the LMF network element may send the second message to the first terminal device by using the PDU session of the first terminal device, that is, perform step S603.

Based on this solution, when the LMF network element does not receive the address information of the SMF network element, the LMF network element may indicate, by using the AMF network element, the first terminal device to establish the PDU session of the first terminal device. Correspondingly, the first terminal device may establish the PDU session of the first terminal device as indicated by the AMF network element, so that there is an available PDU session to transmit positioning service data, to reduce a response delay of the positioning service.

Optionally, when the LMF network element sends the second message to the first terminal device by using the PDU session of the first terminal device, a destination address of the second message is an IP address of the first terminal device. Therefore, after the PDU session of the first terminal device is successfully established, the method shown in FIG. 6 may further include the following step S606.

S606: The LMF network element obtains the IP address of the first terminal device.

The IP address is allocated to the first terminal device by the SMF network element serving the first terminal device in a PDU session establishment process of the first terminal device.

In a possible implementation, for a method for obtaining the IP address of the first terminal device by the LMF network element, refer to the foregoing steps S504a and S504d. Details are not described herein again.

In another possible implementation, in step S605b, the AMF network element may further send address information of the LMF network element to the first terminal device. Correspondingly, in the PDU session establishment process, the first terminal device may notify the SMF network element of the address information of the LMF network element. After the PDU session of the first terminal device is successfully established, the SMF network element may send the IP address of the first terminal device to the LMF network element based on the address information of the LMF network element.

Based on this possible solution, the SMF network element may actively send the IP address of the first terminal device to the LMF network element after the PDU session of the first terminal device is successfully established, so that the LMF network element does not need to interact with the UDM network element to search for the address information of the SMF network element and then request the IP address of the first terminal device from the SMF network element, to reduce signaling interworking between the LMF network element and the UDM network element and the SMF network element, and further reduce the response delay of the positioning service.

In still another possible implementation, in the foregoing step S604a, the LMF network element requests the address information of the SMF network element from the UDM network element. When the UDM network element does not find the address information of the SMF network element, the UDM network element may store the address information of the LMF network element. Subsequently, in the PDU session establishment process of the first terminal device, after receiving related information (for example, information about the SMF network element serving the first terminal device) about the PDU session of the first terminal device, the UDM network element may send the address information of the SMF network element to the LMF network element, so that the LMF network element can learn of the address information of the SMF network element, and send a third message to the SMF network element based on the address information of the SMF network element, to obtain the IP address of the first terminal device. Refer to the foregoing steps S504c and S504d. Details are not described herein again.

Based on this possible solution, the UDM network element may actively send the address information of the SMF network element to the LMF network element after the PDU session of the first terminal device is successfully established, so that the LMF network element does not need to interact with the UDM network element to search for the address information of the SMF network element, to reduce the signaling interworking between the LMF network element and the UDM network element, and further reduce the response delay of the positioning service.

In this case, the LMF network element may send, to the first terminal device based on the PDU session of the first terminal device, the second message whose destination address is the IP address of the first terminal device.

Optionally, in an implementation scenario of this embodiment of this application, after step S603, the method shown in FIG. 6 further includes the following steps S607 to S609.

S607: The first terminal device obtains positioning data.

S608: The first terminal device sends the positioning data to the LMF network element. Correspondingly, the LMF network element receives the positioning data from the first terminal device.

S609: The LMF network element determines location information of the first terminal device based on the positioning data.

Steps S607 to S609 are the same as steps S404 to S406 in the embodiment shown in FIG. 4. For related descriptions, refer to the embodiment shown in FIG. 4. Details are not described herein again.

Based on this possible design, in uplink transmission of the positioning service, positioning data of the positioning service may alternatively be transmitted by using the user plane transmission path of the positioned terminal device, to similarly avoid transmission performed through forwarding of the AMF network element, namely, the control plane transmission path. Therefore, the excessively long response duration of the positioning service caused because the AMF network element cannot forward the data packet of the positioning service in time can be avoided, to further reduce the response duration of the positioning service or reduce the probability of positioning service interruption.

The actions of the network elements in the foregoing steps in FIG. 6 may be performed by the processor 301 in the communication device 300 shown in FIG. 3 by invoking the application program code stored in the memory 303. This is not limited in this embodiment.

It may be understood that, in embodiments of this application, each network element may perform some or all of steps in embodiments of this application. The steps are only examples. In embodiments of this application, other steps or variations of various steps may further be performed. In addition, the steps may be performed in a sequence different from a sequence presented in embodiments of this application, and possibly not all the steps in embodiments of this application need to be performed.

In embodiments of this application, unless otherwise stated or there is a logic collision, terms and/or descriptions between different embodiments are consistent and may be mutually referenced, and technical features in different embodiments may be combined based on an internal logical relationship thereof, to form a new embodiment.

The foregoing mainly describes the solutions provided in embodiments of this application from a perspective of interaction between network elements. It may be understood that, to implement the foregoing functions, the location management network element, the mobility management network element, or the first terminal device includes corresponding hardware structures and/or software modules for performing the functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the, described functions for each particular application, but it should not be considered that the implementation goes beyond the scope of this application.

In embodiments of this application, the location management network element, the mobility management network element, or the First terminal device may be divided into functional modules based on the foregoing method examples. For example, each functional module corresponding to each function may be obtained through division, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 7:
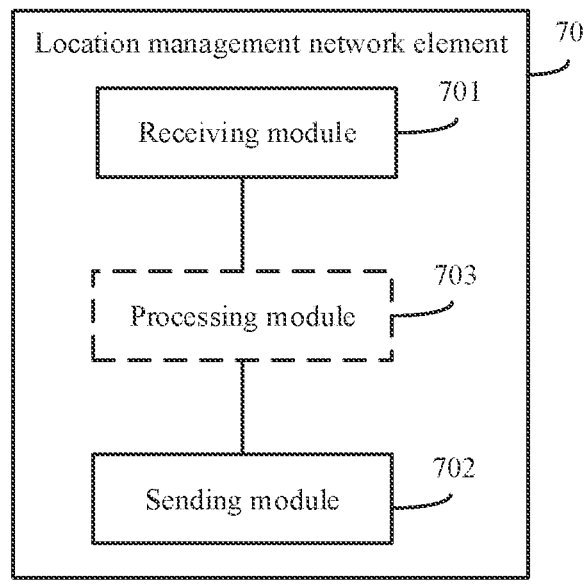
FIG. 7 is a schematic diagram of a structure of a location management network element according to an embodiment of this application.

For example, when functional modules are obtained through division in an integrated manner, FIG. 7 is a schematic diagram of a structure of a location management network element 70. The location management network element 70 includes a receiving module 701 and a sending module 702, and optionally, may further include a processing module 703.

The processing module 703 is configured to control and manage an action of the location management network element. For example, the processing module 703 is configured to support the location management network element in performing the process S406 in FIG. 4, the process S507 in FIG. 5, and the processes S606 and S609 in FIG. 6, and/or another process of the technology described in this specification. The receiving module 701 and the sending module 702 are configured to support the location management network element in communicating with another network entity, for example, communicating with the mobility management network element and/or the first terminal device shown in FIG. 4 to FIG. 6.

Optionally, the location management network element 70 may further include a storage module 704 (not shown in FIG. 7). configured to store program code and data of the location management network element 70. Specifically, reference may be made to the following descriptions:

The receiving module 701 is configured to receive a first message from a mobility management network element, where the first message is used to trigger the location management network element to obtain location information of a first terminal device through user plane positioning. The sending module 702 is configured to send a second message to the first terminal device based on the first message by using a PDU session of the first terminal device, where the second message indicates the first terminal device to report positioning data.

Optionally, the processing module 703 is configured to obtain an IP address of the first terminal device, and that the sending module 702 is configured to send the second message to the first terminal device based on the first message by using the Pau session of the first terminal device includes: The sending module 702 is configured to send the second message to the first terminal device based on the first message by using a user plane network element corresponding to the PM session of the first terminal device, where a destination address of the second message is the IP address of the first terminal device.

Optionally, that the processing module 703 is configured to obtain the IP address of the first terminal device includes: The processing module 703 is configured to receive the IP address that is of the first terminal device and that is from a session management network element by using the receiving module 701, where the session management network element serves the first terminal device.

Optionally, the processing module 703 is further configured to obtain address information of the session management network element, and the sending module 702 is further configured to send a third message to the session management network element based on the address information of the session management network element, where the third message is used to request the IP address of the first terminal device.

Optionally, that the processing module 703 is further configured to obtain the address information of the session management network element includes: The processing module 703 is further configured to send a fourth message to a unified data management network element by using the sending module 702, where the fourth message is used to request the address information of the session management network element, and the processing module 703 is further configured to receive the address information that is of the session management network element and that is from the unified data management network element by using the receiving module 701.

Optionally, the sending module 702 is further configured to send third indication information to the mobility management network element, and the third indication information is used to trigger the mobility management network element to notify the first terminal device to establish the PDU session of the first terminal device.

Optionally, the receiving module 701 is further configured to receive the positioning data from the first terminal device by using the PM session of the first terminal device. The processing module 703 is further configured to determine the location information of the first terminal device based on the positioning data.

All related content of the steps in the foregoing method embodiment may be cited in function descriptions of corresponding functional modules. Details are not described herein again.

In this embodiment, the location management network element 70 is presented in a form of the functional modules obtained through division in the integrated manner. The "module" herein may be an ASIC, a circuit, a processor that executes one or more software or firmware programs, a memory, an integrated logic circuit, and/or another component capable of providing the foregoing functions, In a simple embodiment, a person skilled in the art may figure out that the location management network element 70 may be in a form shown in FIG. 3.

For example, the processor 301 in FIG. 3 may invoke computer-executable instructions stored in the memory 303, so that the location management network element 70 is enabled to perform the positioning request processing method in the foregoing method embodiments.

Specifically, functions/implementation processes of the receiving module 701, the sending module 702, and the processing module 703 in FIG. 7 may be implemented by the processor 301 in FIG. 3 by invoking the computer-executable instructions stored in the memory 303. Alternatively, the functions/the implementation processes of the processing module 703 in FIG. 7 may be implemented by the processor 301 in FIG. 3 by invoking the computer-executable instructions stored in the memory 303, and the functions/the implementation processes of the receiving module 701 and the sending module 702 in FIG. 7 may be implemented by using the communication interface 304 in FIG. 3.

The location management network element 70 provided in this embodiment may perform the foregoing positioning request processing method. Therefore, for a technical effect that can be achieved by the location management network element 70, refer to the foregoing method embodiments. Details are not described herein.

Optionally, an embodiment of this application further provides an apparatus (for example, the apparatus may be a chip system). The apparatus includes a processor, configured to support the location management network element in implementing the foregoing positioning request processing method. In a possible design, the apparatus further includes a memory. The memory is configured to store program instructions and data that are necessary for the location management network element. Certainly, the memory may not be in the apparatus. In another possible design, the apparatus further includes an interface circuit. The interface circuit is a code/data read/write interface circuit, and the interface circuit is configured to: receive computer-executable instructions (where the computer-executable instructions are stored in the memory, and may be directly read from the memory or may be read through another component), and transmit the computer-executable instructions to the processor. When the apparatus is the chip system, the apparatus may include a chip, or may include the chip and another discrete component. This is not specifically limited in embodiments of this application.

Figure 8:
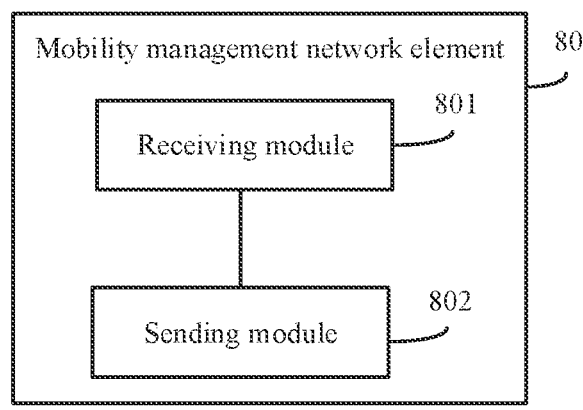
FIG. 8 is a schematic diagram of a structure of a mobility management network element according to an embodiment of this application.

Alternatively, for example, when functional modules are obtained through division in an integrated manner, FIG. 8 is a schematic diagram of a structure of a mobility management network element 80. The mobility management network element 80 includes: a receiving module 801 and a sending module 802.

The receiving module 801 and the sending module 802 are configured to support communication between the mobility management network element and another network entity, for example, communication between the mobility management network element and the location management network element shown in FIG. 4 to FIG. 6.

Optionally, the mobility management network element 80 may further include a processing module 803 and a storage module 804 (not shown in FIG. 8). The processing module 803 is configured to control and manage an action of the mobility management network element. The storage module 804 is configured to store program code and data of the mobility management network element. Specifically, reference may be made to the following descriptions:

The receiving module 801 is configured to receive a request message, where the request message is used to request location information of a first terminal device. The sending module 802 is configured to send a first message to a location management network element based on the request message, where the first message is used to trigger the location management network element to obtain the location information of the first terminal device through user plane positioning.

Optionally, that the sending module 802 is configured to send the first message to the location management network element based on the request message may include: When the mobility management network element is in a congested state, the sending module 802 is configured to send the first message to the location management network element based on the request message.

Optionally, the sending module 802 is further configured to send fourth indication information to a session management network element, where the fourth indication information indicates the session management network element to send an IP address of the first terminal device to the location management network element, and the session management network element serves the first terminal device.

Optionally, the receiving module 801 is further configured to receive third indication information from the location management network element, where the third indication information is used to trigger the mobility management network element to notify the first terminal device to establish a protocol data unit PDU session of the first terminal device. The sending module 802 is further configured to send fifth indication information to the first terminal device based on the third indication information, where the fifth indication information indicates the first terminal device to establish the PDU session of the first terminal device.

All related content of the steps in the foregoing method embodiment may be cited in function descriptions of corresponding functional modules. Details are not described herein again.

In this embodiment, the mobility management network element 80 is presented in a form of the functional modules obtained through division in the integrated manner. The "module" herein may be an ASIC, a circuit, a processor that executes one or more software or firmware programs, a memory, an integrated logic circuit, and/or another component capable of providing the foregoing functions. In a simple embodiment, a person skilled in the art may figure out that the mobility management network element 80 may be in a form shown in FIG.

For example, the processor 301 in FIG. 3 may invoke the computer-executable instructions stored in the memory 303, so that the mobility management network element 80 is enabled to perform the positioning request processing method in the foregoing method embodiments.

Specifically, functions/implementation processes of the receiving module 801 and the sending module 802 in FIG. 8 may be implemented by the processor 301 in FIG. 3 by invoking the computer-executable instructions stored in the memory 303. Alternatively, the functions/the implementation processes of the receiving module 801 and the sending module 802 in FIG. 8 may be implemented by using the communication interface 304 in FIG. 3.

The mobility management network element 80 provided in this embodiment may perform the foregoing positioning request processing method. Therefore, for a technical effect that can be achieved by the mobility management network element 80, refer to the foregoing method embodiments. Details are not described herein.

Optionally, an embodiment of this application further provides an apparatus (for example, the apparatus may be a chip system). The apparatus includes a processor, configured to support the mobility management network element in implementing the foregoing positioning request processing method. In a possible design, the apparatus further includes a memory. The memory is configured to store program instructions and data that are necessary for the mobility management network element. Certainly, the memory may not be in the apparatus. In another possible design, the apparatus further includes an interface circuit. The interface circuit is a code/data read/write interface circuit, and the interface circuit is configured to: receive computer-executable instructions (where the computer-executable instructions are stored in the memory, and may be directly read from the memory or may be read through another component), and transmit the computer-executable instructions to the processor. When the apparatus is the chip system, the apparatus may include a chip, or may include the chip and another discrete component. This is not specifically limited in embodiments of this application.

Figure 9:
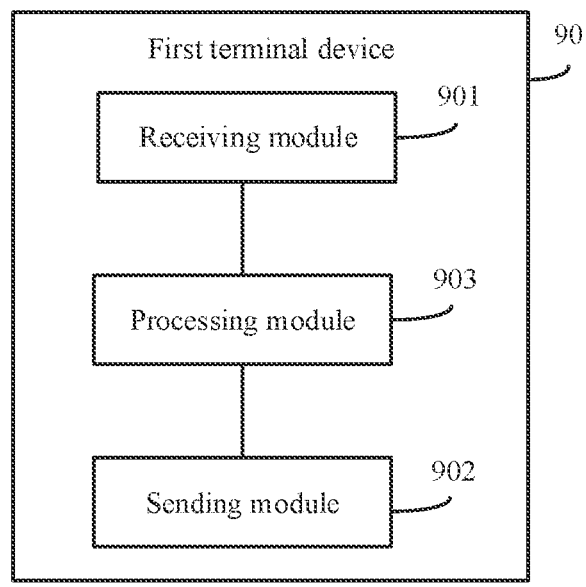
FIG. 9 is a schematic diagram of a structure of a first terminal device according to an embodiment of this application.

For example, when functional modules are obtained through division integrated manner. FIG. 9 is a schematic diagram of a structure of a first terminal device 90. The first terminal device 90 includes a receiving module 901, a sending module 902, and a processing module 903.

The processing module 903 is configured to control and manage an action of the first terminal device. For example, the processing module 903 is configured to support the first terminal device in performing the process S404 in FIG. 4, the process S505 in FIG. 5, the process S607 in FIG. 6, and/or another process of the technology described in this specification. The receiving module 901 and the sending module 902 are configured to support communication between the first terminal device and another network entity, for example, communication with the mobility management network element and/or the location management network element shown in FIG. 4 to FIG. 6.

Optionally, the first terminal device 90 may further include a storage module 904 (not shown in FIG. 9), configured to store program code and data of the first terminal device 90. Specifically, reference may be made to the following descriptions:

The receiving module 901 is configured to receive a second message from a location management network element by using a PDU session of the first terminal device. The processing module 903 is configured to obtain positioning data based on the second message. The sending module 902 is configured to send the positioning data to the location management network element by using the PDU session of the first terminal device.

Optionally, that the receiving nodule 901 is configured to receive the second message from the location management network element by using the PDU session of the first terminal device includes: The receiving module 901 is configured to receive the second message from the location management network element by using a user plane network element corresponding to the PDU session of the first terminal device, where a destination address of the second message is an internet protocol IP address of the first terminal device.

Optionally, that the sending module 902 is configured to send the positioning data to the location management network element by using the PDU session of the first terminal device includes: The sending module 902 is configured to send the positioning data to the location management network element by using the user plane network element corresponding to the PDU session of the first terminal device.

Optionally, the receiving module 901 is further configured to receive fifth indication information from a mobility management network element, where the fifth indication information indicates the first terminal device to establish the PDU session of the first terminal device. The processing module 903 is further configured to establish the PDU session of the first terminal device based on the fifth indication information.

All related content of the steps in the foregoing method embodiment may be cited in function descriptions of corresponding functional modules. Details are not described herein again.

In this embodiment, the first terminal device 90 is presented in a form of the functional modules obtained through division in the integrated manner. The "module" herein may be an ASIC, a circuit, a processor that executes one or more software or firmware programs, a memory, an integrated logic circuit, and/or another component capable of providing the foregoing functions. In a simple embodiment, a person skilled in the art may figure out that the form shown in FIG. 3 may be used for the first terminal device 90.

For example, the processor 301 in FIG. 3 may invoke the computer-executable instructions stored in the memory 303, so that the first terminal device 90 is enabled to perform the positioning request processing method in the foregoing method embodiments.

Specifically, functions/implementation processes of the receiving module 901, the sending module 902, and the processing module 903 in FIG. 9 may be implemented by the processor 301 in FIG. 3 by invoking the computer-executable instructions stored in the memory 303. Alternatively, the functions/the implementation processes of the processing module 903 in FIG. 9 may be implemented by the processor 301 in FIG. 3 by invoking the computer-executable instructions stored in the memory 303, and the functions/the implementation processes of the receiving module 901 and the sending module 902 may be implemented by using the communication interface 304 in FIG. 3.

The first terminal device 90 provided in this embodiment may perform the foregoing positioning request processing method. Therefore, for a technical effect that can be achieved by the first terminal device 90, refer to the foregoing method embodiments. Details are not described herein.

Optionally, an embodiment of this application further provides an apparatus (for example, the apparatus may be a chip system). The apparatus includes a processor, configured to support the first terminal device in implementing the foregoing positioning request processing method. In a possible design, the apparatus further includes a memory. The memory is configured to store program instructions and data that are necessary for the first terminal device. Certainly, the memory may not be in the apparatus. In another possible design, the apparatus further includes an interface circuit. The interface circuit is a code/data read write interface circuit, and the interface circuit is configured to: receive computer-executable instructions (where the computer-executable instructions are stored in the memory, and may be directly read from the memory or may be read through another component), and transmit the computer-executable instructions to the processor. When the apparatus is the chip system, the apparatus may include a chip or may include the chip and another discrete component. This is not specifically limited in embodiments of this application.

All or a part of the foregoing embodiments may be implemented through software, hardware, firmware, or any combination thereof. When a software program is used to implement the embodiments, all or a part of the embodiments may be implemented in a form of a computer program product. The computer program product includes one or more computer instructions. When computer program instructions are loaded and executed on a computer, procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to embodiments, in a process of implementing this application that claims protection, a person skilled in the art may understand and implement another variation of the disclosed embodiments by viewing the accompanying drawings, disclosed content, and appended claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clearly that various modifications and combinations may be made to them without departing from the spirit and scope of this application. Correspondingly, the specification and accompanying drawings are merely example descriptions of this application defined by the accompanying claims, and are considered as any of or all modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A positioning request processing method, wherein the method comprises:
   receiving, by a location management network element, a first message from a mobility management network element, wherein the first message is used to trigger the location management network element to obtain location information of a first terminal device through user plane positioning;
   after receiving the first message from the mobility management network element, determining, by the location management network element, to use a user plane connection to obtain the location information of the first terminal device; and
   sending, by the location management network element, a second message to the first terminal device based on the first message by using a protocol data unit (PDU) session of the first terminal device, wherein the PDU session is the user plane connection, and the second message indicates the first terminal device to report positioning data.

2. The method according to claim 1, wherein the first message comprises first indication information, and the first indication information indicates the location management network element to obtain the location information of the first terminal device through user plane positioning.

3. The method according to claim 1, wherein the first message comprises second indication information, and the second indication information indicates that the mobility management network element is in a congested state to trigger the location management network element to obtain the location information of the first terminal device through user plane positioning.

4. The method according to claim 1, wherein the method further comprises:
   obtaining, by the location management network element, an internet protocol (IP) address of the first terminal device; and
   the sending, by the location management network element, a second message to the first terminal device based on the first message by using a PDU session of the first terminal device comprises:
   sending, by the location management network element, the second message to the first terminal device based on the first message by using a user plane network element corresponding to the PDU session of the first terminal device, wherein a destination address of the second message is the IP address of the first terminal device.

5. The method according to claim 4, wherein the obtaining, by the location management network element, an internet protocol (IP) address of the first terminal device comprises:
   receiving, by the location management network element, the IP address that is of the first terminal device and that is from a session management network element, wherein the session management network element serves the first terminal device.

6. The method according to claim 5, wherein the method further comprises:
   obtaining, by the location management network element, address information of the session management network element; and
   sending, by the location management network element, a third message to the session management network element based on the address information of the session management network element, wherein the third message is used to request the IP address of the first terminal device.

7. The method according to claim 6, wherein the obtaining, by the location management network element, address information of the session management network element comprises:
   sending, by the location management network element, a fourth message to a unified data management network element, wherein the fourth message is used to request the address information of the session management network element; and
   receiving, by the location management network element, the address information that is of the session management network element and that is from the unified data management network element.

8. The method according to claim 1, wherein the method further comprises:
   sending, by the location management network element, third indication information to the mobility management network element, wherein the third indication information is used to trigger the mobility management network element to notify the first terminal device to establish the PDU session of the first terminal device.

9. The method according to claim 1, wherein the method further comprises:
   receiving, by the location management network element, the positioning data from the first terminal device by using the PDU session of the first terminal device; and determining, by the location management network element, the location information of the first terminal device based on the positioning data.

10. A positioning request processing method, wherein the method comprises:
receiving, by a first terminal device, fifth indication information from a mobility management network element, wherein the fifth indication information indicates the first terminal device to establish a protocol data unit (PDU) session of the first terminal device;
establishing, by the first terminal device, the PDU session of the first terminal device based on the fifth indication information;
receiving, by the first terminal device, a second message from a location management network element by using the PDU session of the first terminal device;
obtaining, by the first terminal device, positioning data based on the second message; and
sending, by the first terminal device, the positioning data to the location management network element by using the PDU session of the first terminal device.

11. The method according to claim 10, wherein the receiving, by a first terminal device, a second message from a location management network element by using a PDU session of the first terminal device comprises:
receiving, by the first terminal device, the second message from the location management network element by using a user plane network element corresponding to the PDU session of the first terminal device, wherein a destination address of the second message is an internet protocol (IP) address of the first terminal device.

12. The method according to claim 10, wherein the sending, by the first terminal device, the positioning data to the location management network element by using the PDU session of the first terminal device comprises:
sending, by the first terminal device, the positioning data to the location management network element by using a user plane network element corresponding to the PDU session of the first terminal device.

13. A communication apparatus, wherein the communication apparatus comprises at least one processor and a memory coupled to the at least one processor and storing programming instructions for execution by the at least one processor to cause the communication apparatus to:
receive a first message from a mobility management network element, wherein the first message is used to trigger the communication apparatus to obtain location information of a first terminal device through user plane positioning;
after receiving the first message from the mobility management network element, determine to use a user plane connection to obtain the location information of the first terminal device; and
send a second message to the first terminal device based on the first message by using a protocol data unit (PDU) session of the first terminal device, wherein the PDU session is the user plane connection, and the second message indicates the first terminal device to report positioning data.

14. The communication apparatus according to claim 13, wherein the first message comprises first indication information, and the first indication information indicates the communication apparatus to obtain the location information of the first terminal device through user plane positioning.

15. The communication apparatus according to claim 13, wherein the first message comprises second indication information, and the second indication information indicates that the mobility management network element is in a congested state to trigger the communication apparatus to obtain the location information of the first terminal device through user plane positioning.

16. The communication apparatus according to claim 13, wherein the programming instructions are executed by the at least one processor to cause the communication apparatus to:
obtain an internet protocol (IP) address of the first terminal device; and
send the second message to the first terminal device based on the first message by using a user plane network element corresponding to the PDU session of the first terminal device, wherein a destination address of the second message is the IP address of the first terminal device.

17. The communication apparatus according to claim 13, wherein the programming instructions are executed by the at least one processor to cause the communication apparatus to:
send third indication information to the mobility management network element, wherein the third indication information is used to trigger the mobility management network element to notify the first terminal device to establish the PDU session of the first terminal device.

18. A communication apparatus, wherein the communication apparatus comprises at least one processor and a memory coupled to the at least one processor and storing programming instructions for execution by the at least one processor to cause the communication apparatus to:
receive fifth indication information from a mobility management network element, wherein the fifth indication information indicates the communication apparatus to establish a protocol data unit (PDU) session of the communication apparatus;
establish the PDU session of the communication apparatus based on the fifth indication information;
receive a second message from a location management network element by using the PDU session of the communication apparatus;
obtain positioning data based on the second message; and
send the positioning data to the location management network element by using the PDU session of the communication apparatus.

19. The communication apparatus according to claim 18, wherein the programming instructions are executed by the at least one processor to cause the communication apparatus to:
receive the second message from the location management network element by using a user plane network element corresponding to the PDU session of the communication apparatus, wherein a destination address of the second message is an internet protocol (IP) address of the communication apparatus.

20. The communication apparatus according to claim 18, wherein the programming instructions are executed by the at least one processor to cause the communication apparatus to:
send the positioning data to the location management network element by using a user plane network element corresponding to the PDU session of the communication apparatus.

* * * * *